(12) United States Patent
Omata et al.

(10) Patent No.: US 9,007,009 B2
(45) Date of Patent: Apr. 14, 2015

(54) CONTROL APPARATUS FOR AC MOTOR

(71) Applicant: Denso Corporation, Kariya, Aichi-pref. (JP)

(72) Inventors: Ryuji Omata, Obu (JP); Takeshi Itoh, Nagoya (JP); Hirofumi Kako, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 14/174,147

(22) Filed: Feb. 6, 2014

(65) Prior Publication Data
US 2014/0225551 A1 Aug. 14, 2014

(30) Foreign Application Priority Data

Feb. 8, 2013 (JP) .................................. 2013-23225

(51) Int. Cl.
| | |
|---|---|
| H02P 1/00 | (2006.01) |
| H02P 1/28 | (2006.01) |
| H02P 3/00 | (2006.01) |
| H02P 23/00 | (2006.01) |
| H02P 21/14 | (2006.01) |
| B60L 15/20 | (2006.01) |
| H02P 21/00 | (2006.01) |

(52) U.S. Cl.
CPC .............. *H02P 23/005* (2013.01); *H02P 21/14* (2013.01); *B60L 15/20* (2013.01); *H02P 21/0035* (2013.01)

(58) Field of Classification Search
CPC ...... H02P 21/0035; H02P 21/14; B60L 15/20
USPC ........................................................... 318/504
See application file for complete search history.

(56) References Cited

U.S. PATENT DOCUMENTS

| | | | | |
|---|---|---|---|---|
| 2002/0097015 | A1* | 7/2002 | Kitajima et al. | 318/432 |
| 2007/0085508 | A1* | 4/2007 | Fujitsuna et al. | 318/712 |
| 2008/0079385 | A1 | 4/2008 | Hashimoto et al. | |
| 2009/0128081 | A1* | 5/2009 | Yoneda et al. | 318/689 |
| 2009/0267550 | A1* | 10/2009 | Hida et al. | 318/400.15 |

FOREIGN PATENT DOCUMENTS

JP 2004-159391 6/2004

OTHER PUBLICATIONS

Omata, et al., U.S. Appl. No. 14/174,102, filed Feb. 6, 2014.
Omata, et al., U.S. Appl. No. 14/174,159, filed Feb. 6, 2014.
Omata, et al., U.S. Appl. No. 14/174,161, filed Feb. 6, 2014.
Omata, et al., U.S. Appl. No. 14/174,193, filed Feb. 6, 2014.
Omata, et al., U.S. Appl. No. 14/174,200, filed Feb. 6, 2014.
Omata, et al., U.S. Appl. No. 14/174,213, filed Feb. 6, 2014.
Omata, et al., U.S. Appl. No. 14/174,515, filed Feb. 6, 2014.

* cited by examiner

*Primary Examiner* — Erick Glass
(74) *Attorney, Agent, or Firm* — Nixon & Vanderhye PC

(57) ABSTRACT

In a motor control apparatus for controlling an AC motor with an inverter, a current estimation value is calculated based on a current detection value of one phase of the motor and a rotation angle of the motor. A difference between a current command value related to driving of the AC motor and the current estimation value is calculated. A first voltage command value used to generate a drive signal related to driving of the inverter is calculated based on the difference. A sign of the difference is reversed at a reverse interval when the rotation speed is not greater than a determination threshold.

10 Claims, 22 Drawing Sheets

FIG. 9A TORQUE
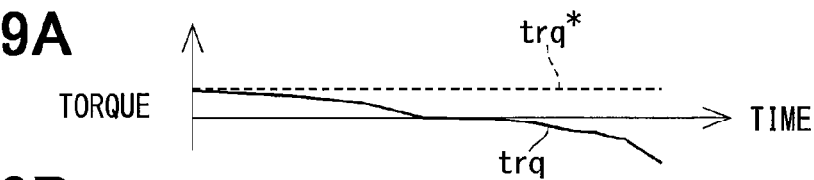
FIG. 9B ROTATION SPEED
FIG. 9C d-AXIS CURRENT
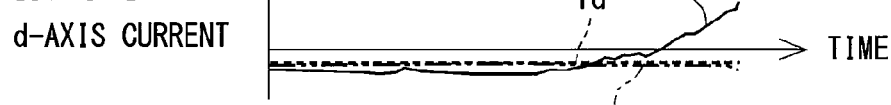
FIG. 9D q-AXIS CURRENT
FIG. 9E d-AXIS VOLTAGE
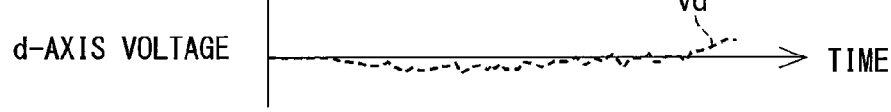
FIG. 9F q-AXIS VOLTAGE
FIG. 9G U-PHASE CURRENT
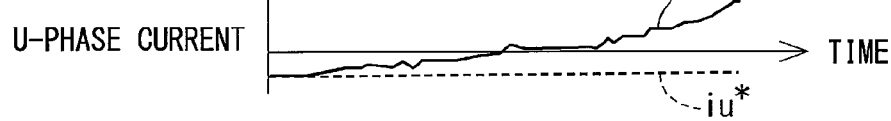
FIG. 9H V-PHASE CURRENT
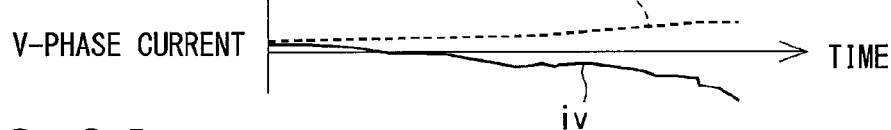
FIG. 9I W-PHASE CURRENT

FIG. 13A TORQUE
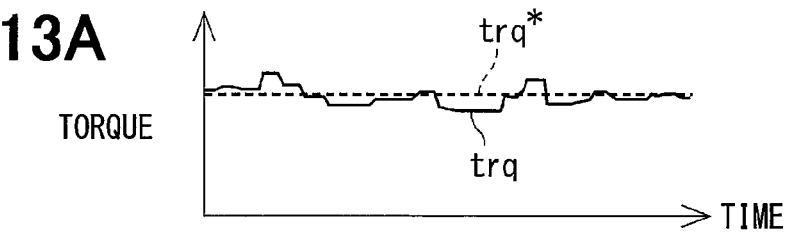
FIG. 13B ROTATION SPEED
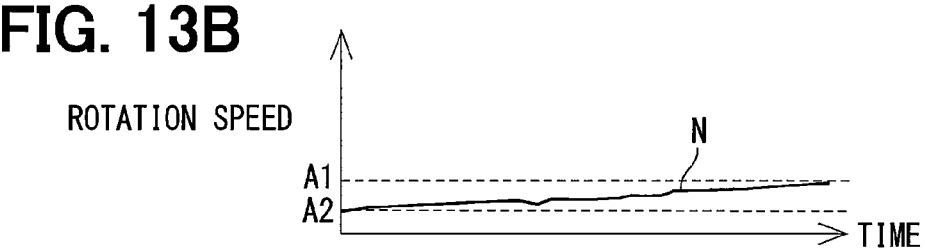
FIG. 13C d-AXIS CURRENT
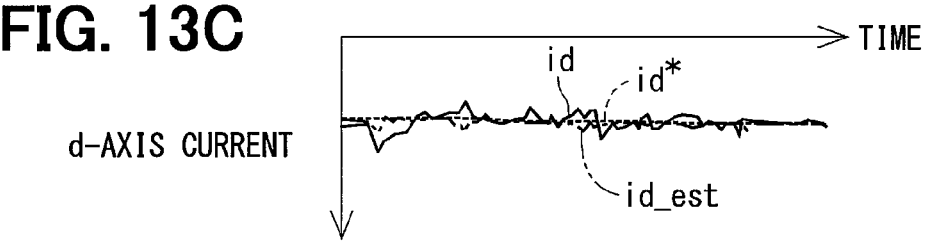
FIG. 13D q-AXIS CURRENT
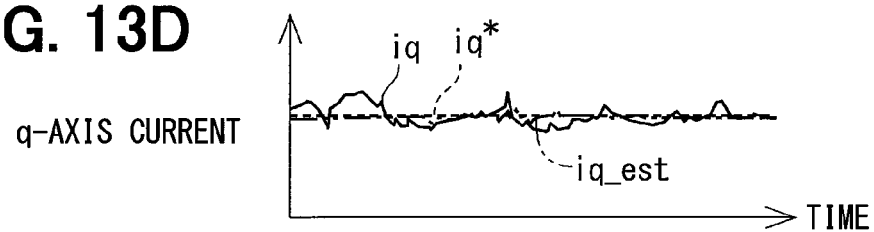
FIG. 13E d-AXIS VOLTAGE
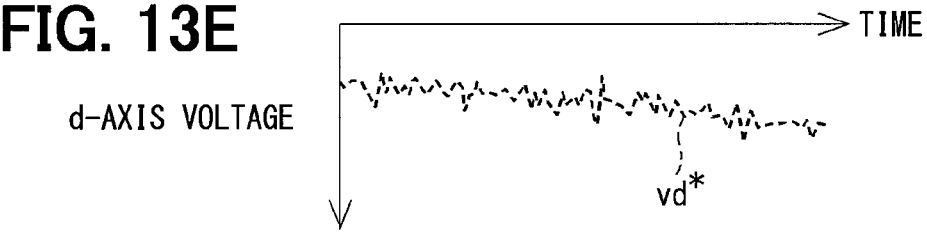
FIG. 13F q-AXIS VOLTAGE
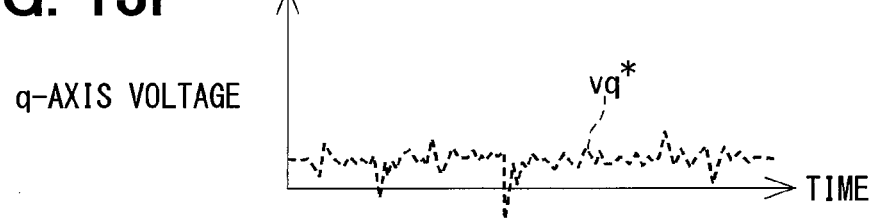

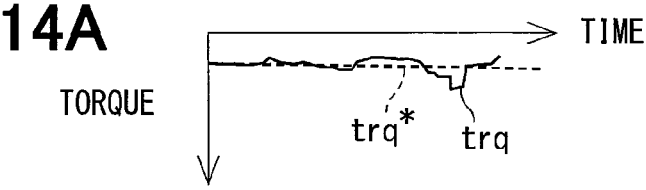
FIG. 14A TORQUE
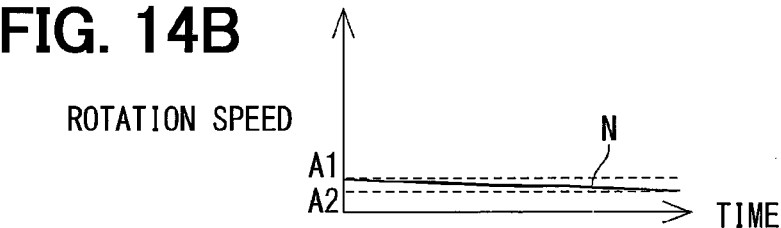
FIG. 14B ROTATION SPEED
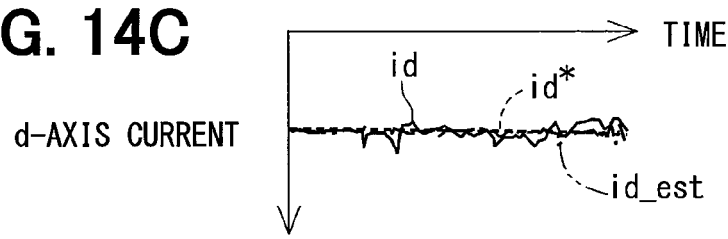
FIG. 14C d-AXIS CURRENT
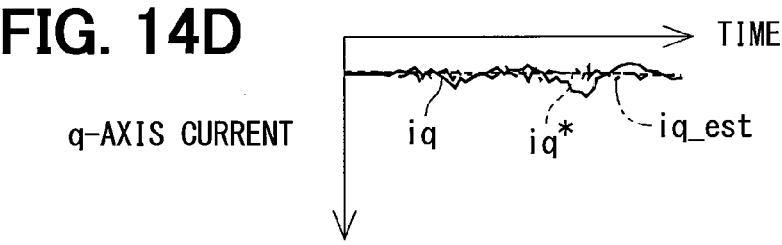
FIG. 14D q-AXIS CURRENT
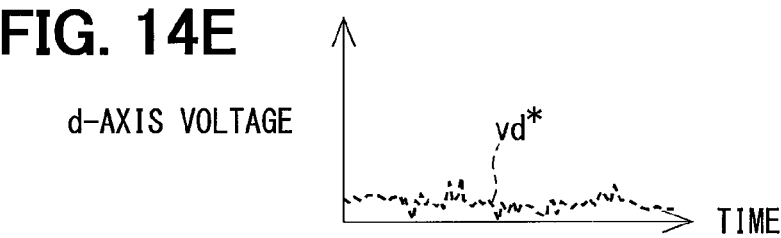
FIG. 14E d-AXIS VOLTAGE
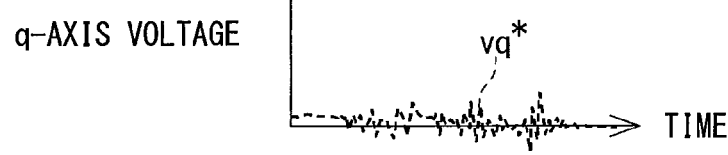
FIG. 14F q-AXIS VOLTAGE

TORQUE trq* trq

TIME

ROTATION SPEED

N

TIME d-AXIS CURRENT id_est
id* id

TIME q-AXIS CURRENT iq*  iq_est  iq

TIME

360[°]

ROTATION INFO

θi
θe

0[°]

TIME

CONTROL APPARATUS FOR AC MOTOR

CROSS REFERENCE TO RELATED APPLICATION

This application is based on Japanese Patent Application No. 2013-23225 filed on Feb. 8, 2013, the contents of which are incorporated herein by reference.

FIELD

The present disclosure relates to a control apparatus for an alternating-current (AC) motor.

BACKGROUND

In recent years, from social demands for low-fuel consumption and low exhaust emission, there has been an increased attention to an electric vehicle or a hybrid vehicle equipped with an alternate-current (AC) motor to run. For example, in a hybrid vehicle, an AC motor is connected to a direct-current (DC) power source such as a rechargeable battery unit through a power converter such as an inverter. The inverter converts a DC voltage supplied from the DC power source to an AC voltage and drives the AC motor with the AC voltage.

JP-A-2008-86139 corresponding to US 2008/0079385 discloses a one-phase control technique for reducing the number of current sensors used in a control apparatus for an AC motor mounted on an electric vehicle or a hybrid vehicle, thereby reducing the size of the apparatus near output terminals of the inverter and the cost of a control system of the AC motor. In the one-phase control technique, a current sensor for detecting a phase current is provided to only one phase of the AC motor.

SUMMARY

The one-phase control is performed based on a current sensor value of one phase and current estimation values of the other phases Three-phase AC current command values obtained by inverse dq transformation of d-axis and q-axis current command values based on an electrical angle are used as the current estimation values. Since the three-phase AC current command values may not accurately reflect actual currents of the AC motor, control of the AC motor may become unstable. In particular, when a rotation speed of the AC motor is low, changes in the current sensor value and a rotation angle in a sampling interval at which the current sensor value is detected are small, so that actual information is much reduced. As a result, the control of the AC motor may become more unstable.

Further, when a sign (i.e., negative or positive) of a difference between a feedback current estimation value and a current command value is different from (i.e., opposite to) a sign of a difference between an actual current value and the current command value, control is performed so that a difference between the actual current value and the current command value can increase. If such a state continues, the difference between the actual current value and the current command value continues to increase. Eventually, the actual current value diverges.

In view of the above, it is an object of the present disclosure to provide a control apparatus for controlling an AC motor without a divergence of control even when a rotation speed of the AC motor is low.

According to an aspect of the present disclosure, a control apparatus is used for controlling a three-phase AC motor to which a voltage controlled by an inverter is applied. The control apparatus includes a current receiver, a rotation angle receiver, a rotation speed calculator, a current estimator, a difference calculator, a voltage command value calculator, and a difference reverser. The current receiver receives a current detection value from a current sensor which is provided to one of three phases of the AC motor. The rotation angle receiver receives a rotation angle detection value from a rotation angle sensor that detects a rotation angle of the AC motor. The rotation speed calculator calculates a rotation speed of the AC motor based on the rotation angle detection value. The current estimator calculates a current estimation value based on the current detection value and the rotation angle detection value. The difference calculator calculates a difference between a current command value related to driving of the AC motor and the current estimation value. The first voltage command value calculator calculates a first voltage command value based on the difference. The first voltage command value is used to generate a drive signal related to driving of the inverter. The difference reverser reverses a sign of the difference at a reverse interval when the rotation speed is not greater than a determination threshold.

BRIEF DESCRIPTION OF THE DRAWINGS

The above and other objects, features and advantages of the present disclosure will become more apparent from the following detailed description made with reference to the accompanying drawings. In the drawings:

FIGS. 9A, 9B, 9C, 9D, 9E, 9F, 9G, 9H, and 9I are timing diagrams for explaining a divergence of a current;

FIGS. 13A, 13B, 13C, 13D, 13E, and 13F are timing diagrams for explaining a behavior of the AC motor observed when the difference reverse control procedure is performed according to the first embodiment;

FIGS. 14A, 14B, 14C, 14D, 14E, and 14F are timing diagrams for explaining a behavior of the AC motor observed when the difference reverse control procedure is performed according to the first embodiment;

DETAILED DESCRIPTION

Figure 1:
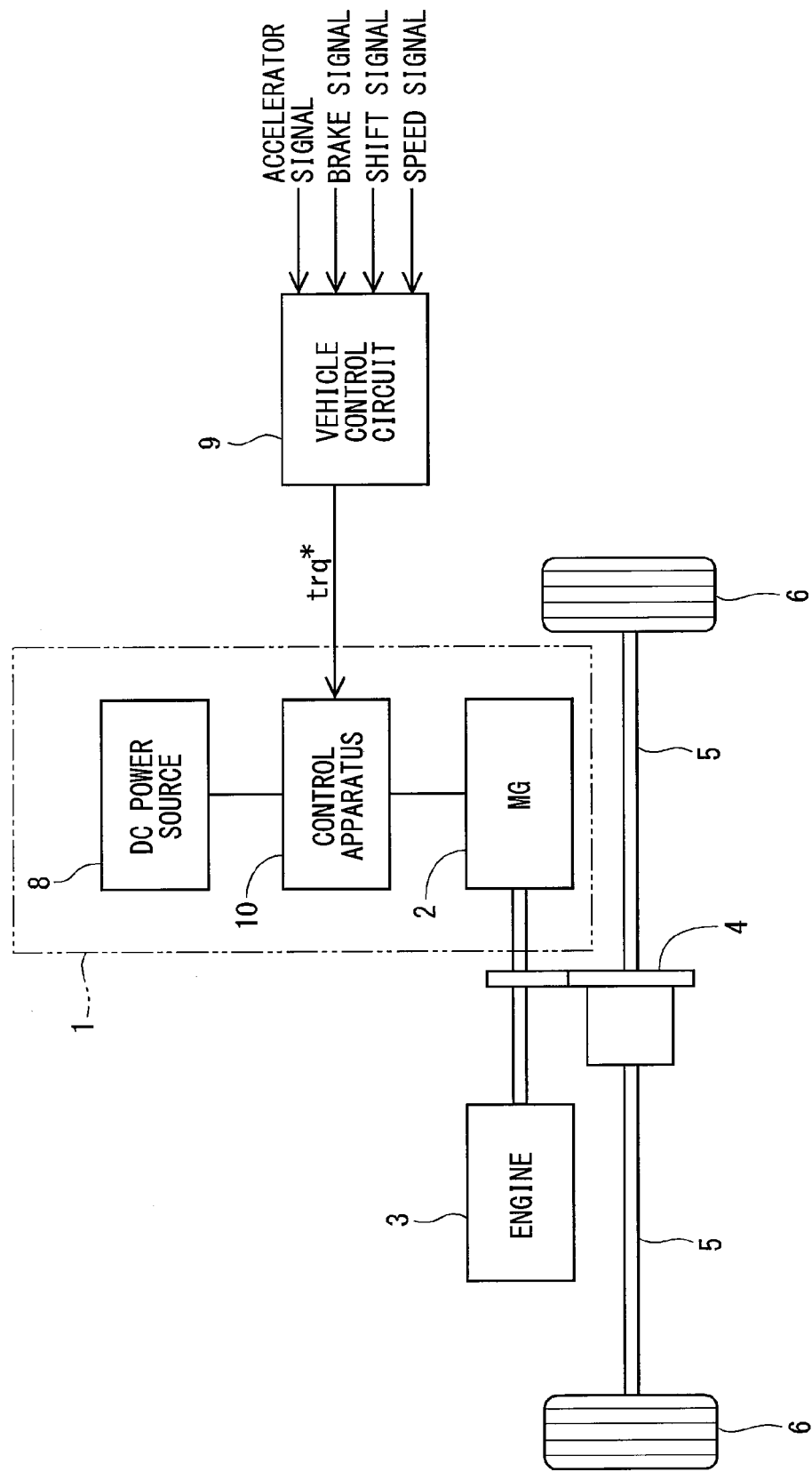
FIG. 1 is a diagram illustrating an AC motor drive system according to a first embodiment of the present disclosure.

A control apparatus for an AC motor according to the present disclosure is described below with reference to the drawings. Throughout embodiments, the same reference characters refer to similar parts.

First Embodiment

As shown in FIG. 1, a motor control apparatus 10 according to a first embodiment of the present disclosure is applied to a motor drive system 1 for driving a motor-operated vehicle.

The motor drive system 1 includes an AC motor 2, a DC power source 8, and the motor control apparatus 10.

For example, the AC motor 2 can be a motor for generating torque to drive a drive wheel 6 of the motor-operated vehicle. According to the first embodiment, the AC motor 2 is a permanent magnet three-phase synchronous motor.

The motor-operated vehicle is a vehicle that uses electric power to drive the drive wheel 6. Examples of the motor-operated vehicle can include a hybrid vehicle, an electric vehicle, and a fuel cell vehicle. According to the first embodiment, the motor-operated vehicle is a hybrid vehicle with an engine 3, and the AC motor 2 is a so-called motor generator (MG) serving as not only a motor to generate torque to drive the drive wheel 6 but also a generator to generate electric power by being driven with kinetic energy transmitted from the engine 3 and the drive wheel 6.

The AC motor 2 is connected to an axle 5 of the vehicle through a gear 4 such as a transmission so that torque of the AC motor 2 can be transmitted to the axle 5 though the gear 4. Thus, the axle 5 is rotated so that the drive wheel 6 can be driven.

The DC power source 8 is a rechargeable power storage device such as an electric double-layer capacitor or a secondary battery such as a lithium-ion battery or a nickel hydride battery. The DC power source 8 is connected to an inverter 12 (refer to FIG. 2) of the motor control apparatus 10 and exchanges electric power with the AC motor 2 through the inverter 12.

For example, a vehicle control circuit 9 is configured as a microcomputer and includes a CPU, a ROM, and an I/O that are connected through buses. The vehicle control circuit 9 controls the whole of the vehicle by software by executing prestored programs using the CPU or by hardware using a specific electronic circuit.

The vehicle control circuit 9 is capable of receiving signals from sensors and switches. For example, the vehicle control circuit 9 can receive an accelerator signal from an accelerator sensor (not shown), a brake signal from a brake sensor (not shown), a shift signal from a shift switch (not shown), and a speed signal from a vehicle speed sensor (not shown). The vehicle control circuit 9 detects operating conditions of the vehicle based on the received signals and outputs a torque command value trq* to the motor control apparatus 10 according to the operating conditions. Further, the vehicle control circuit 9 outputs a command signal to an engine control circuit (not shown) that controls operations of the engine 3.

Figure 2:
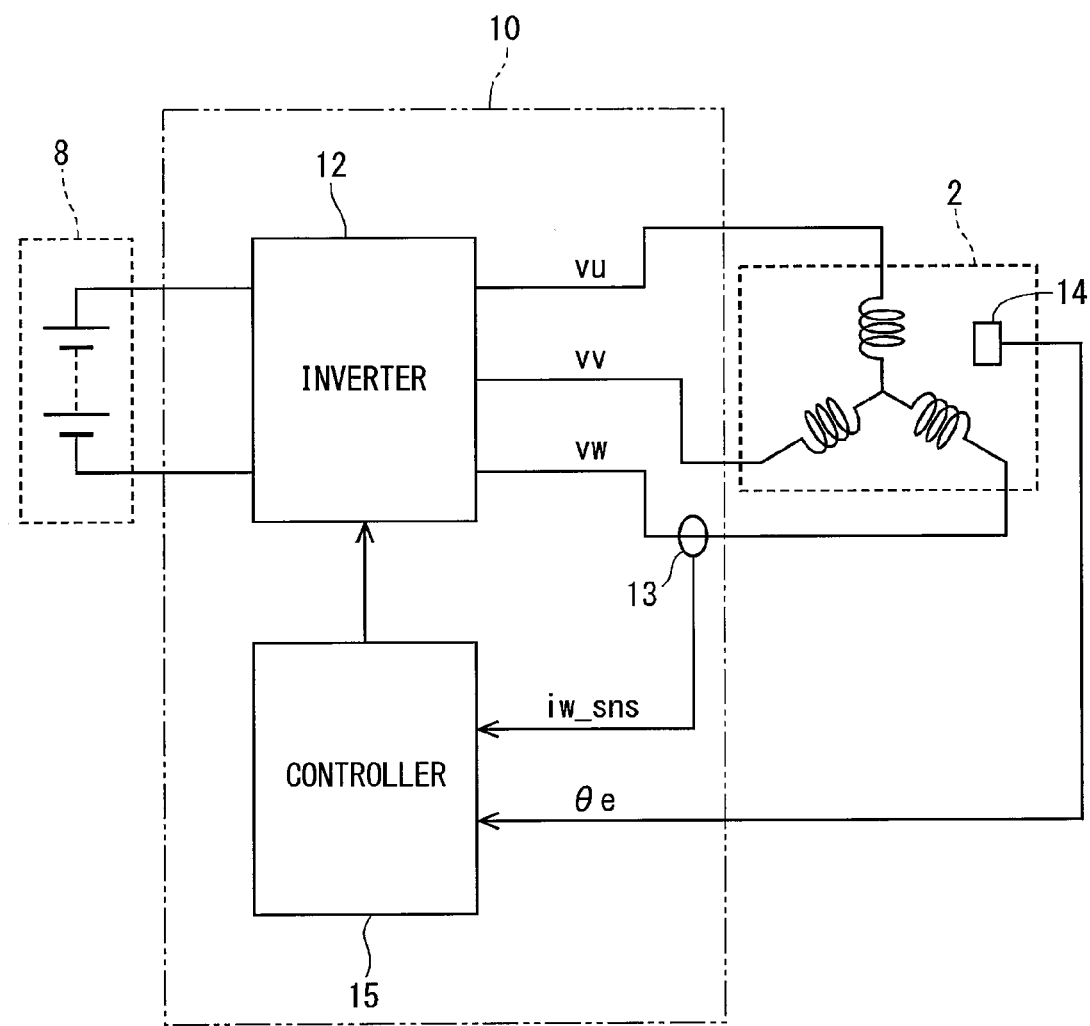
FIG. 2 is a diagram illustrating a motor drive apparatus according to the first embodiment.

As shown in FIG. 2, the motor control apparatus 10 includes the inverter 12 and a controller 15.

An inverter input voltage VH is applied to the inverter 12 according to driving conditions of the AC motor 2 and vehicle requests. The inverter input voltage VH is generated by stepping up a DC voltage of the DC power supply 8 using a step-up converter (not shown). The inverter 12 includes six switching devices (not shown) connected in a bridge configuration. The six switching devices include three high-potential-side switching devices (hereinafter referred to as "upper switching devices") and three low-potential-side switching devices (hereinafter referred to as "lower switching devices"). Each upper switching device is connected in series to a corresponding one of the lower switching devices to form a leg circuit. Each leg circuit is provided to a corresponding one of three phases of the AC motor 2. Examples of the switching device include an insulated-gate bipolar transistor (IGBT), a metal oxide semiconductor (MOS) transistor, and a bipolar transistor. The switching devices are controlled (i.e., turned ON and OFF) based on PWM signals UU, UL, VU, VL, WU, and WL outputted from a PWM signal generator 29 (refer to FIG. 3) of the controller 15 so that the inverter 12 can control three-phase AC voltages vu, vv, and vw applied to the AC motor 2. The AC motor 2 is controlled (i.e., driven) by the three-phase AC voltages vu, vv, and vw generated and applied by the inverter 12.

A current sensor 13 is provided to any one of the three phases of the AC motor 2. According to the first embodiment, the current sensor 13 is provided to the W-phase of the AC motor 2. The W-phase to which the current sensor 13 is provided hereinafter referred to as a "sensor-phase". The current sensor 13 detects a phase current of the W-phase as the sensor-phase and outputs a W-phase current detection value iw_sns indicative of the detected phase current to the controller 15. The controller 15 receives the W-phase current detection value iw_sns. Alternatively, the U-phase or the V-phase instead of the W-phase can be the sensor-phase.

A rotation angle sensor 14 is located near a rotor (not shown) of the AC motor 2. The rotation angle sensor 14 detects an electrical angle θe and outputs the electrical angle θe to the controller 15. The controller 15 receives the electrical angle θe. According to the first embodiment, the rotation angle sensor 14 is a resolver. Alternatively, the rotation angle sensor 14 can be a rotary encoder or the like. According to the first embodiment, the electrical angle θe is measured with respect to a U-phase axis.

The AC motor 2 is controlled as follows. Based on a rotation speed N of the rotor of the AC motor 2 (hereinafter referred to simply as the "rotation speed N of the AC motor 2"), which is calculated from the electrical angle θe detected by the rotation angle sensor 14, and the torque command value trq*, which is received from the vehicle control circuit 9, the motor control apparatus 10 causes the AC motor 2 to consume power by performing a motoring operation as a motor or to generate power by performing a regeneration operation as a generator. Specifically, the motor control apparatus 10 causes the AC motor 2 to operate in one of the following four modes based on a sign (i.e., positive or negative) of the rotation speed N and a sign of the torque command value trq*.

<First mode> forward rotation/forward torque (power consumption)
<Second mode> forward rotation/reverse torque (power generation)
<Third mode> reverse rotation/reverse torque (power consumption)
<Fourth mode> reverse rotation/forward torque (power generation)

When the rotation speed N is greater than 0 (i.e., forward rotation) and the torque command value trq* is greater than 0, or when the rotation speed N is less than 0 (i.e., reverse rotation) and the torque command value trq* is less than 0, the inverter 12 converts DC power supplied from the DC power source 8 to AC power by switching operations of the switching devices and supplies the AC power to the AC motor 2 so that the AC motor 2 can output torque. Thus, the AC motor 2 performs the motoring operation.

In contrast, when the rotation speed N is greater than 0 (i.e., forward rotation) and the torque command value trq* is less than 0, or when the rotation speed N is less than 0 (i.e., reverse rotation) and the torque command value trq* is greater than 0, the inverter 12 converts AC power generated by the AC motor 2 to DC power by switching operations of the switching devices and supplies the DC power to the DC power source 8 so that the DC power source 8 can be charged. Thus, the AC motor 2 performs the regeneration operation.

Figure 3:
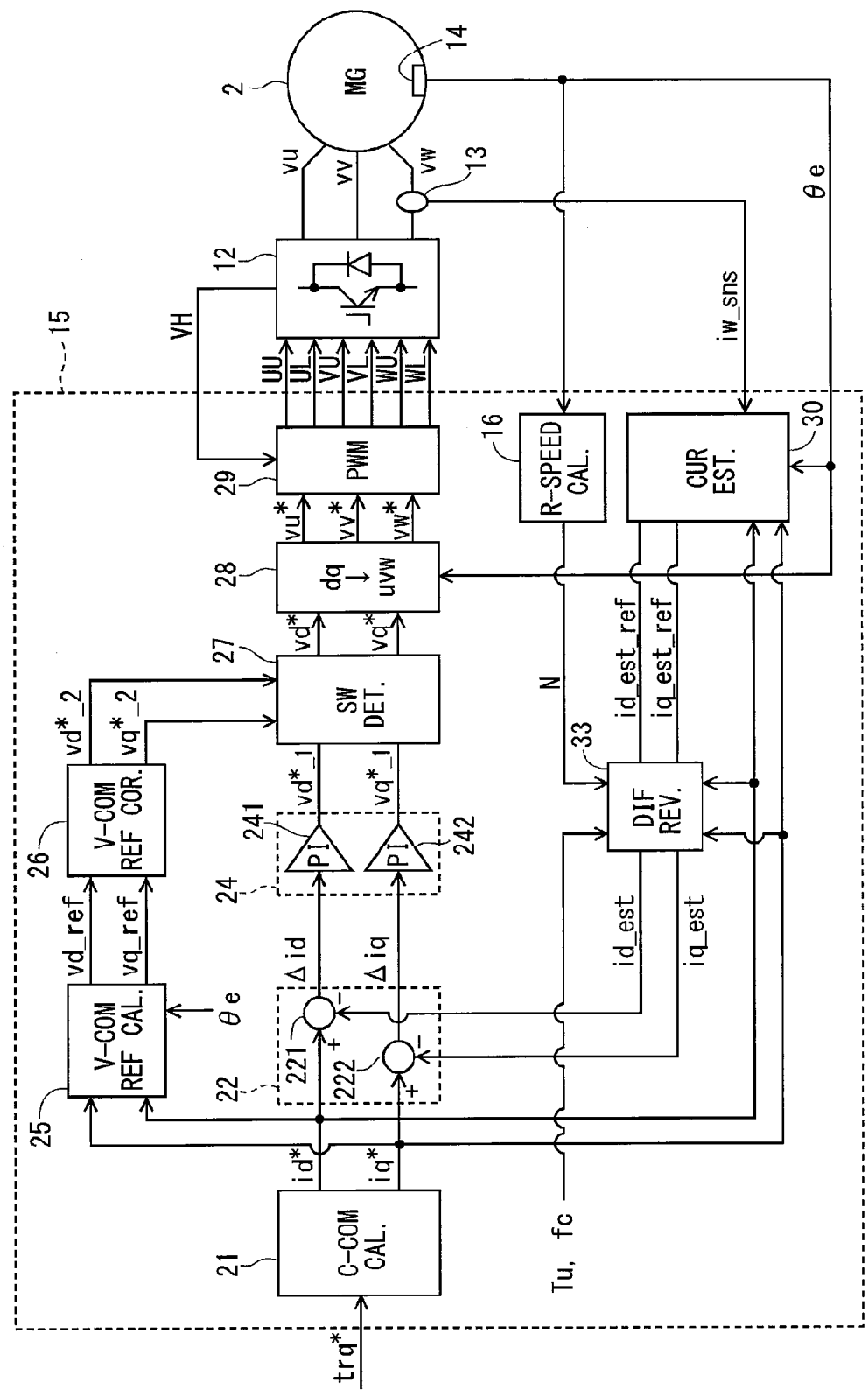
FIG. 3 is a block diagram of a controller according to the first embodiment.

Next, the controller 15 is described in detail with reference to FIG. 3. As shown in FIG. 3, the controller 15 includes a rotation speed calculator 16, a current command value calculator 21, a subtractor 22, a PI calculator 24, a voltage command reference value calculator 25, a voltage command reference value corrector 26, a switch determinator 27, a three-phase voltage command value calculator 28, the PWM signal generator 29, a current estimator 30, and a difference reverser 33.

The rotation speed calculator 16 calculates the rotation speed N of the AC motor 2 based on the electrical angle θe.

Based on the torque command value trq* received from the vehicle control circuit 9, the current command value calculator 21 calculates a d-axis current command value id* and a q-axis current command value iq* in a rotating coordinate system (d-q coordinate system) of the AC motor 2. According to the first embodiment, the d-axis current command value id* and the q-axis current command value iq* are calculated by referring to a prestored map. Alternatively, the d-axis current command value id* and the q-axis current command value iq* can be calculated from a formula or the like.

The subtractor 22 includes a d-axis current subtractor 221 and a q-axis current subtractor 222. The d-axis current subtractor 221 calculates a d-axis current difference Δid. The d-axis current difference Δid is a difference between a d-axis current estimation value id_est, which is fed back from the current estimator 30, and the d-axis current command value id*. The q-axis current subtractor 222 calculates a q-axis current difference Δiq. The q-axis current difference Δiq is a difference between a q-axis current estimation value iq_est, which is fed back from the current estimator 30, and the q-axis current command value iq*.

The PI calculator 24 includes a d-axis PI calculator 241 and a q-axis PI calculator 242. The d-axis PI calculator 241 calculates a first d-axis voltage command value vd*_1 by PI calculation so that the d-axis current difference Δid can converge to zero [A], thereby causing the d-axis current estimation value id_est to follow the d-axis current command value id*. The q-axis PI calculator 242 calculates a first q-axis voltage command value vq*_1 by PI calculation so that the q-axis current difference Δiq can converge to zero [A], thereby causing the q-axis current estimation value iq_est to follow the q-axis current command value iq*.

The voltage command reference value calculator 25 calculates d-axis and q-axis voltage command reference values vd_ref and vq_ref based on the d-axis and q-axis current command values id* and iq* by using voltage equations as a theoretical formula for a motor. The d-axis and q-axis voltage command reference values vd_ref and vq_ref are derived directly from the d-axis and q-axis current command values id* and iq* and therefore can be regarded as a feedforward (FF) term.

In general, voltage equations of a motor are given by the following formulas (1) and (2).

$$vd = Ra \times id + Ld \times (d/dt)id - \omega \times Lq \times iq \quad (1)$$

$$vq = Ra \times iq + Lq \times (d/dt)iq + \omega \times Ld \times id + \omega \times \psi \quad (2)$$

The formulas (1) and (2) can be respectively rewritten into the following formulas (3) and (4) by ignoring the time-derivative term (d/dt) as transient property, by using the d-axis and q-axis current command values id* and iq* as d-axis and q-axis current values id and iq, and by using the d-axis and q-axis voltage command reference values vd_ref and vq_ref as d-axis and q-axis voltage values vd and vq.

$$vd\_ref = Ra \times id^* - \omega \times Lq \times iq^* \quad (3)$$

$$vq\_ref = Ra \times iq^* + \omega \times Ld \times id^* + \omega \times \psi \quad (4)$$

In the formulas (1)-(4), Ra represents an armature resistance, Ld represents a d-axis self-inductance, Lq represents a q-axis self-inductance, ω represents an electrical angular velocity, and ψ represents an armature interlinkage magnetic flux of a permanent magnet.

The armature resistance Ra, the d-axis self-inductance Ld, the q-axis self-inductance Lq, and the armature interlinkage magnetic flux ψ are machine constants of the AC motor 2. The machine constants can be fixed values or calculated values. For example, the machine constants can be calculated based on the torque command value trq* (or the d-axis and q-axis current command values id* and iq*) by using a map which is created in advance with actual measurement values or values having almost actual characteristics.

The electrical angular velocity ω is calculated by the voltage command reference value calculator 25 based on the electrical angle θe. Alternatively, the electrical angular velocity ω can be calculated based on the rotation speed N.

When the rotation speed N is zero [rpm], the electrical angular velocity ω also becomes zero [rad/s]. Therefore, the term of the electrical angular velocity ω in each of the formulas (3) and (4) becomes zero so that only the resistance term is left. The resistance term becomes small depending on the armature resistance Ra and the current command value. Further, due to physical factors of the AC motor 2 and the motor control apparatus 10, the theoretical voltage command reference values calculated from the voltage equations may deviate from voltage command values necessary for the AC motor 2 to actually output torque corresponding to the torque command value trq*. Therefore, it is preferable that the d-axis and q-axis voltage command reference values vd_ref and vq_ref should be suitably corrected so that the AC motor 2 can be started up. For this reason, according to the first embodiment, the d-axis and q-axis voltage command reference values vd_ref and vq_ref are corrected by the voltage command reference value corrector 26.

The voltage command reference value corrector 26 calculates second d-axis and q-axis voltage command values vd*_2 and vq*_2 by correcting the d-axis and q-axis voltage command reference values vd_ref and vq_ref, respectively. According to the first embodiment, the voltage command reference value corrector 26 calculates d-axis and q-axis voltage command correction values vd_cmp and vq_cmp which correspond to the differences between the theoretical voltage command reference values calculated from the voltage equations and the voltage command values necessary for the AC motor 2 to output torque corresponding to the torque command value trq*.

Then, as shown in the following equations (5) and (6), the voltage command reference value corrector 26 calculates the second d-axis and q-axis voltage command values vd*_2 and vq*_2 by correcting the d-axis and q-axis voltage command reference values vd_ref and vq_ref using the d-axis and q-axis voltage command correction values vd_cmp and vq_cmp, respectively.

$$vd^*\_2 = vd\_\text{ref} + vd\_\text{cmp} \quad (5)$$

$$vq^*\_2 = vq\_\text{ref} + vq\_\text{cmp} \quad (6)$$

The d-axis and q-axis voltage command correction values vd_cmp and vq_cmp can be any values, as long as they can correct the d-axis and q-axis voltage command reference values vd_ref and vq_ref. For example, the d-axis and q-axis voltage command correction values vd_cmp and vq_cmp can correspond to a voltage error due to a dead time which is provided to prevent a short-circuit occurring when the upper and lower switching devices of the inverter 12 are turned ON at the same time. For another example, the d-axis and q-axis voltage command correction values vd_cmp and vq_cmp can be calculated by referring to a prestored map based on actual machine data.

Alternatively, the second d-axis and q-axis voltage command values vd*_2 and vq*_2 can be calculated by correcting the d-axis and q-axis voltage command reference values vd_ref and vq_ref by multiplying each of the formulas (5) and (6) by a coefficient K. The coefficient K can be any value. For example, the coefficient K can be a ratio between the W-phase current command value iw* and the W-phase current detection value iw_sns, which are W-phase components of the d-axis current command value id* and the q-axis current command value iq*.

The switch determinator 27 selects the first d-axis and q-axis voltage command values vd*_1 and vq*_1 or the second d-axis and q-axis voltage command values vd*_2 and vq*_2 as the d-axis and q-axis voltage command values vd* and vq* used to calculate drive signals (i.e., the PWM signals UU, UL, VU, VL, WU, and WL) for driving the inverter 12. According to the first embodiment, when the rotation speed N is greater than a second determination threshold A2, the switch determinator 27 selects the first d-axis and q-axis voltage command values vd*_1 and vq*_1 as the d-axis and q-axis voltage command values vd* and vq*. In contrast, when the rotation speed N is not greater than the second determination threshold A2, the switch determinator 27 selects the second d-axis and q-axis voltage command values vd*_2 an vq*_2 as the d-axis and q-axis voltage command values vd* and vq*. According to the first embodiment, the second determination threshold A2 is smaller than a first determination threshold value A1 which is described later.

The three-phase voltage command value calculator 28 performs inverse dq transformation based on the electrical angle θe received from the rotation angle sensor 14 so that the d-axis and q-axis voltage command values vd* and vq* can be converted to a U-phase voltage command value vu*, a V-phase voltage command value vv*, and a W-phase voltage command value vw*.

The PWM signal generator 29 calculates the PWM signals UU, UL, VU, VL, WU, and WL based on the three-phase voltage command values vu*, vv*, and vw* and the inverter input voltage VH applied to the inverter 12.

The switching devices of the inverter 12 are turned ON and OFF based on the PWN signals UU, UL, VU, VL, WU, and WL so that the three-phase AC voltages vu, vv, and vw can be generated. The three-phase AC voltages vu, vv, and vw are applied to the AC motor 2 to control the AC motor 2 so that the AC motor 2 can output torque corresponding to the torque command value trq*. The three-phase AC voltages vu, vv, and vw correspond to an application voltage recited in claims.

The current estimator 30 calculates d-axis and q-axis current reference estimation values id_est_ref and iq_est_ref based on the W-phase current detection value iw_sns and the electrical angle θe. According to the first embodiment, the d-axis and q-axis current reference estimation values id_est_ref and iq_est_ref are calculated based on the d-axis and q-axis current command values id* and iq* in addition to the W-phase current detection value iw_sns and the electrical angle θe. Specifically, U-phase and V-phase current command values iu* and iv*, which are calculated by inverse dq transformation of the d-axis and q-axis current command values id* and iq*, are used as U-phase and V-phase current estimation values iu_est and iv_est. Then, the d-axis and q-axis current reference estimation values id_est_ref and iq_est_ref are calculated by dq transformation of the U-phase and V-phase current estimation values iu_est and iv_est and the W-phase current detection value iw_sns.

The d-axis and q-axis current reference estimation values id_est_ref and iq_est_ref can be calculated based on the W-phase current detection value iw_sns and the electrical angle θe by any other method than that described above. Likewise, the U-phase and V-phase current estimation values iu_est and iv_est can be calculated by any other method than that described above. If the U-phase and V-phase current estimation values iu_est and iv_est are unnecessary for the calculation of the d-axis and q-axis current reference estimation values id_est_ref and iq_est_ref, there is no need to calculate the U-phase and V-phase current estimation values iu_est and iv_est.

When the rotation speed N is not greater than a first threshold value A1, the difference reverser 33 alternately selects the d-axis current reference estimation value id_est_ref calculated by the current estimator 30 or a d-axis current reverse estimation value id_est_rev at a predetermined reserve interval Tr as the d-axis current estimation value id_est to be fed back. Likewise, when the rotation speed N is not greater than a first threshold value A1, the difference reverser 33 alternately selects the q-axis current reference estimation value iq_est_ref calculated by the current estimator 30 or a q-axis current reverse estimation value iq_est_rev at the reserve interval Tr as the q-axis current estimation value qd_est to be fed back. In contrast, when the rotation speed N is greater than the first threshold value A1, the difference reverser 33 selects the d-axis and q-axis current reference estimation values id_est_ref and the iq_est_ref calculated by the current estimator 30 as the d-axis and q-axis current estimation values id_est and iq_est to be fed back.

The d-axis and q-axis current reverse estimation values id_est_rev and iq_est_rev, which allow the signs of the d-axis and q-axis current differences Δid and Δiq to be reversed, are given by the following formulas (7) and (8).

$$Id\_est\_rev = 2id^* - id\_est \qquad (7)$$

$$Iq\_est\_rev = 2id^* - iq\_est \qquad (8)$$

According to the first embodiment, when the rotation speed N is not greater than the first determination threshold A1, the difference reverser 33 alternately selects the d-axis and q-axis current reference estimation values id_est_ref and iq_est_ref or the d-axis and q-axis current reverse estimation values id_est_rev and iq_est_rev at the reserve interval Tr as the d-axis and q-axis current estimation values id_est and iq_est to be fed back. Accordingly, the signs of the d-axis and q-axis current differences Δid and Δiq calculated by the subtractor 22 are reversed at the reverse interval Tr.

That is, feeding back the d-axis and q-axis current estimation values id_est and iq_est that reverse the signs of the d-axis and q-axis current differences Δid and Δiq substantially means reversing the signs of the d-axis and q-axis current differences Δid and Δiq.

Figure 4:
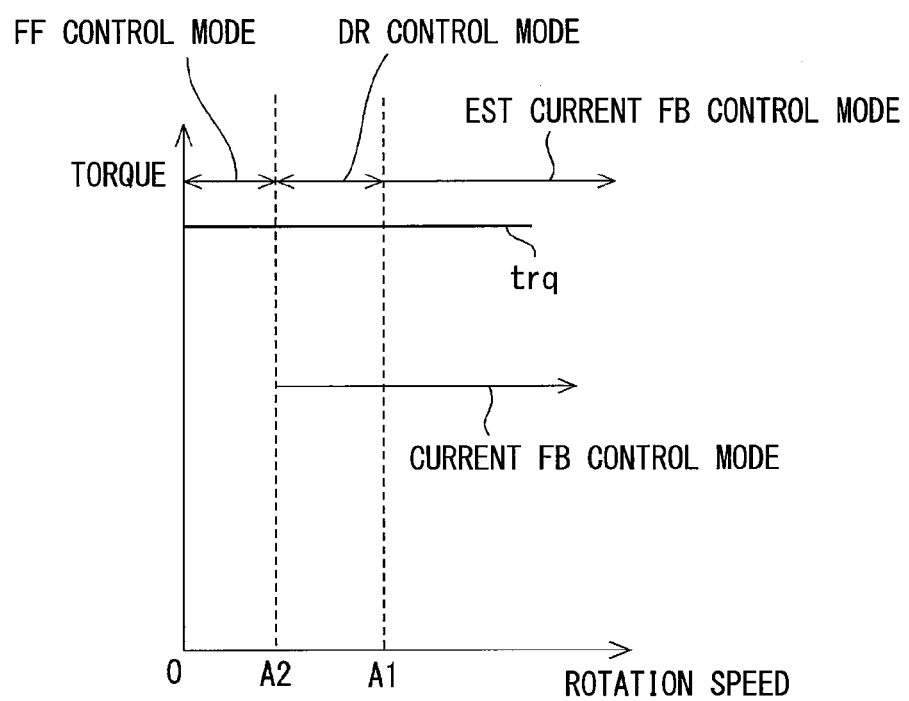
FIG. 4 is a diagram for explaining a switching of a control mode of an AC motor based on a rotation speed of the AC motor according to the first embodiment.

According to the first embodiment, a control mode of the AC motor 2 is switched based on the rotation speed N as shown in FIG. 4.

When the rotation speed N is not greater than the second determination threshold A2, the AC motor 2 is controlled in a FF voltage command control mode (hereinafter referred to simply as the "FF control mode"). In the FF control mode, the drive signals (i.e., the PWM signals UU, UL, VU, VL, WU, and WL) for driving the inverter 12 are generated based on the second d-axis and q-axis voltage command values vd*_2 and vq*_2.

When the rotation speed N is greater than the second determination threshold A2, the AC motor 2 is controlled in a current feedback control mode (hereinafter referred to simply as the "current FB control mode"). In the current FB control mode, the drive signals (i.e., the PWM signals UU, UL, VU, VL, WU, and WL) for driving the inverter 12 are generated based on the first d-axis and q-axis voltage command values vd*_1 and vq*_1. It is noted that in the current FB control mode, a detection value of a current flowing through the AC motor 2 (e.g., the W-phase current detection value iw_sns in the first embodiment) is fed back to calculate the first d-axis and q-axis voltage command values vd*_1 and vq*_1.

When the rotation speed N is greater than the second determination threshold A2 and not greater than the first determination threshold A1, the AC motor 2 is controlled in a difference reverse control mode (hereinafter referred to simply as the "DR control mode"). In the DR control mode, the signs of the d-axis and q-axis current differences Δid and Δiq are reversed at the reverse interval Tr.

When the rotation speed N is greater than the first determination threshold A1, the AC motor 2 is controlled in an estimation current feedback (FB) control mode. In the estimation current FB control mode, the signs of the d-axis and q-axis current differences Δid and Δiq are maintained unchanged.

According to the first embodiment, the DR control mode and the estimation current FB control mode are included in the current FB control mode.

The current FB control mode corresponds to a first control mode recited in claims, and the FF control mode corresponds to a second control mode recited in claims. According to the first embodiment, since the current sensor 13 is provided to only one phase of the AC motor 2, not only the current FB control mode but also the FF control mode can be regarded as a one-phase control in a broad sense.

Figure 5A:
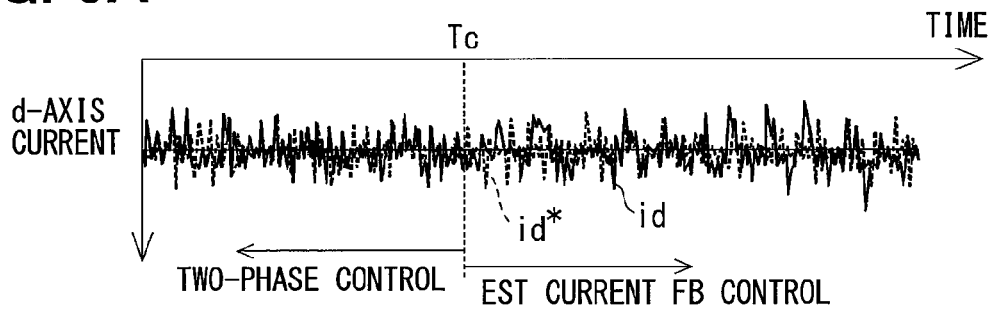
FIGS. 5A, 5B, and 5C are timing diagrams for explaining a behavior of an AC motor observed when a rotation speed of the AC motor is high.
Figure 5B:
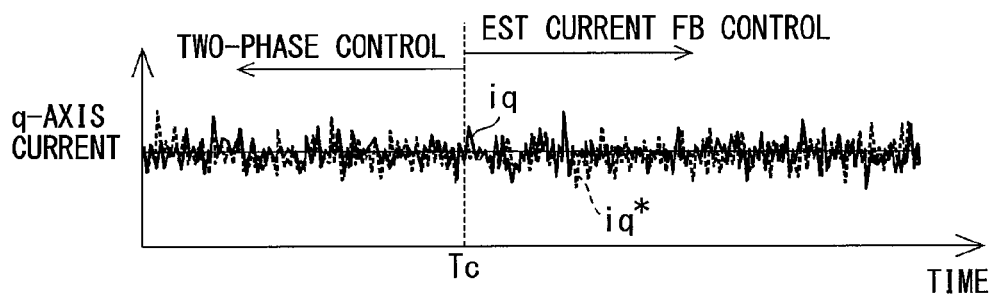
Figure 5C:
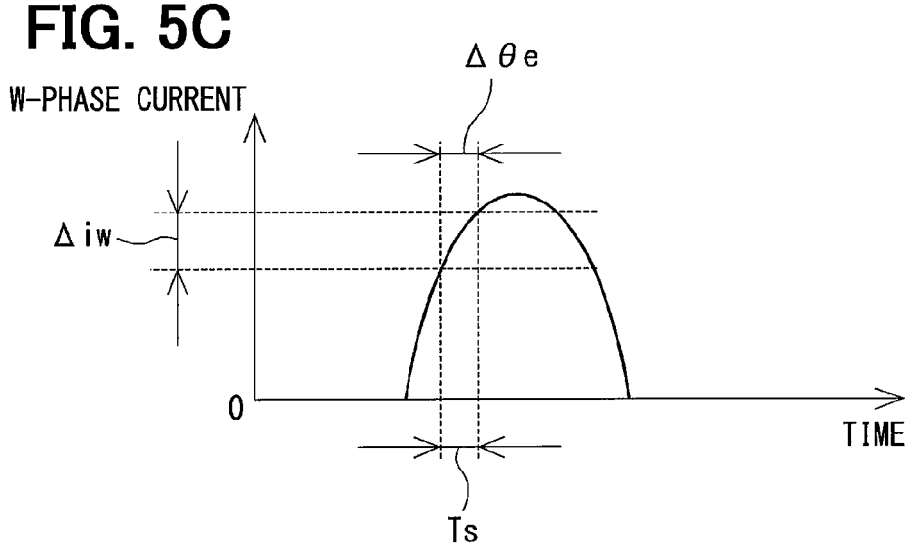
Figure 6A:
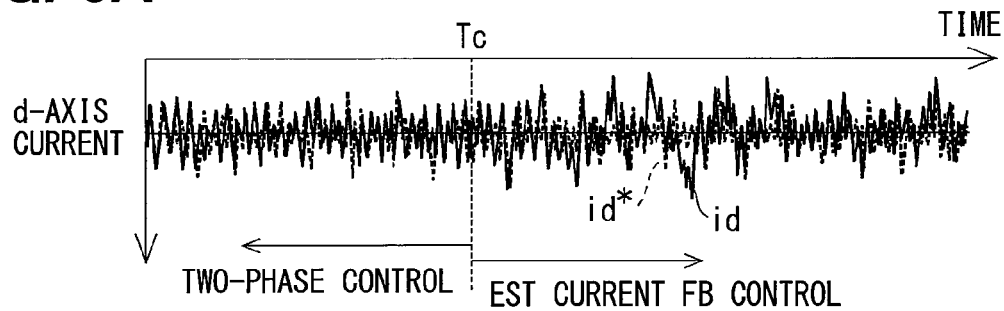
FIGS. 6A, 6B, and 6C are timing diagrams for explaining a behavior of the AC motor observed when the rotation speed is middle.
Figure 6B:
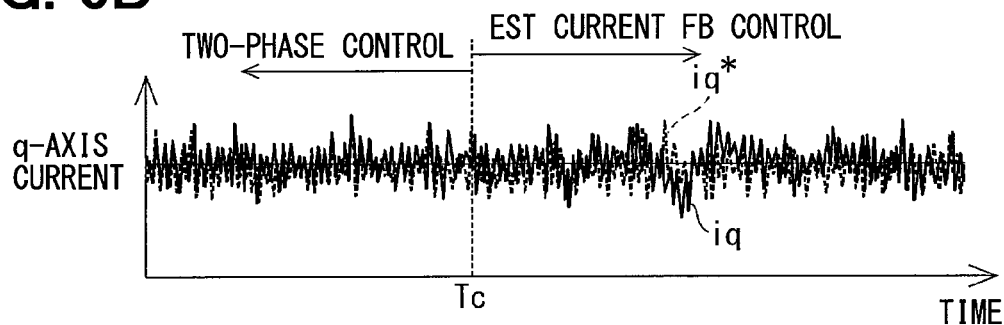
Figure 6C:
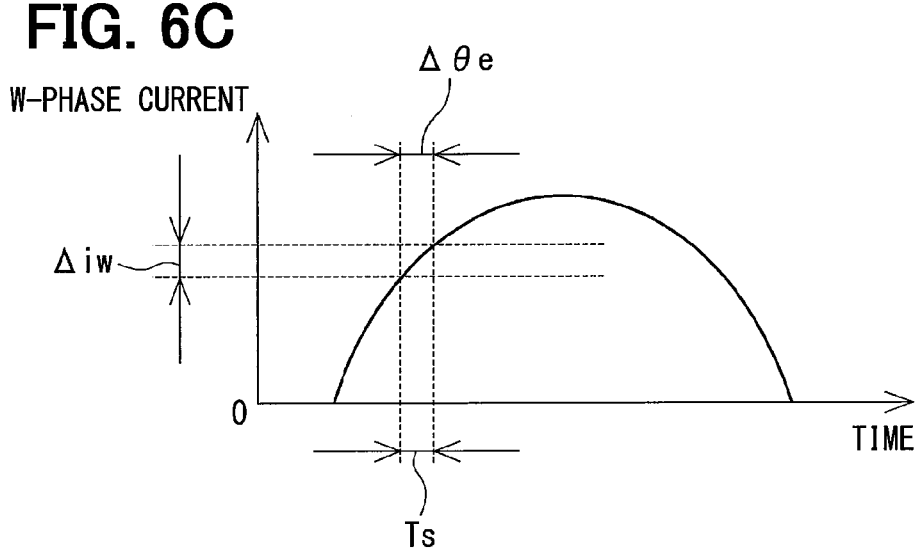
Figure 7A:
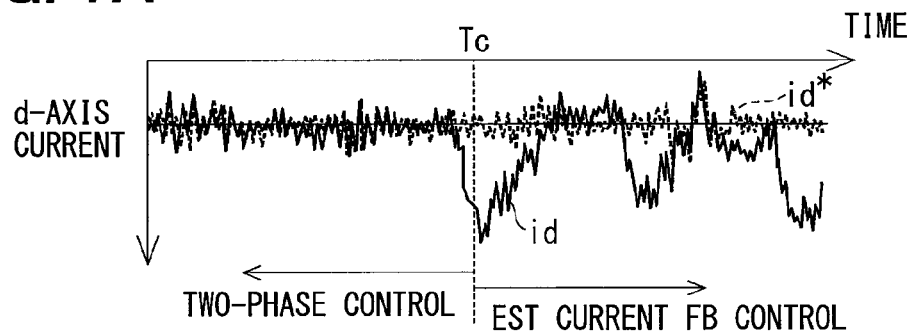
FIGS. 7A, 7B, and 7C are timing diagrams for explaining a behavior of the AC motor observed when the rotation speed is low.
Figure 7B:
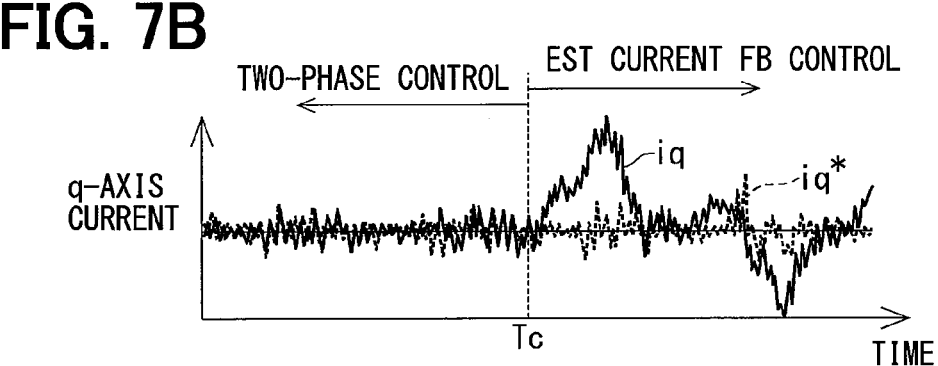
Figure 7C:
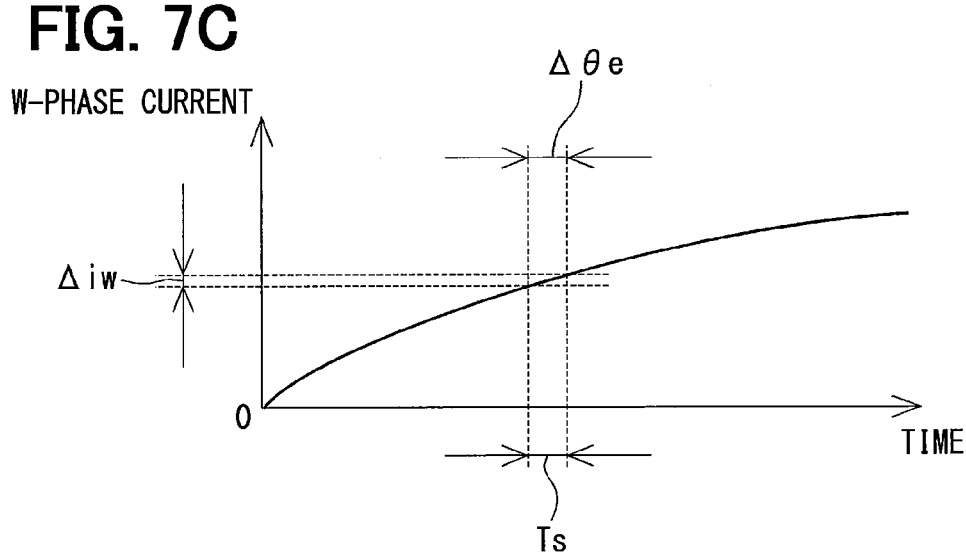

Next, the estimation current FB control mode is described below with reference to FIGS. 5A-5C, 6A-6C, 7A-7C, 8A-8C, and 9A-9I. FIGS. 5A-5C show a case where the rotation speed N of the AC motor 2 is high, FIGS. 6A-6C show a case where the rotation speed N of the AC motor 2 is middle, and FIGS. 7A-7C show a case where the rotation speed N of the AC motor 2 is low. The terms "low rotation speed", "middle rotation speed", and "high rotation speed" are used in a relative sense and are not meant to describe concrete rotation speeds of the AC motor 2. That is, when the rotation speed N related to FIGS. 5A-5C is defined as N1, the rotation speed N related to FIGS. 6A-6C is defined as N2, and the rotation speed N related to FIGS. 7A-7C is defined as N3, the following relationship is satisfied: N1≤N2≤N3. A sampling interval Ts at which a current sensor detects a phase current of the AC motor 2 is uniform among FIGS. 5A-5C, 6A-6C, and 7A-7C. FIGS. 5A, 6A, and 7A represent a d-axis current. FIGS. 5B, 6B, and 7B represent a q-axis current. FIGS. 5C, 6C, and 7C represent a relationship among the sampling interval Ts, an electrical angle change Δθe, and a current change Δiw. In FIGS. 5A, 5B, 6A, 6B, 7A, and 7B, the control mode of the AC motor 2 is switched at a time Tc to the estimation current FB control mode, where the AC motor 2 is controlled based on a current detection value of one phase (e.g., W-phase current detection value iw_sns in the first embodiment), from a two-phase control mode, where two current sensor are separately provided to two phases of the AC motor 2, and the AC motor 2 is controlled based on current detection values of the two phases. FIG. 9A represents a torque, FIG. 9B represents a rotation speed, FIG. 9C represents a d-axis current, FIG. 9D represents a q-axis current, FIG. 9E represents a d-axis voltage, FIG. 9F represents a q-axis voltage, FIG. 9G represents a U-phase current, FIG. 9H represents a V-phase current, and FIG. 9I represents a W-phase current. In FIGS. 5A-5C, 6A-6C, 7A-7C, 8A-8C, and 9A-9I, a solid line represents an actual value, a broken line represents a command value, and a chain double-dashed line represents an estimation value.

As shown in FIGS. 5A and 5B, when the control mode is switched form the two-phase control mode to the estimation current FB control mode under a condition that the rotation speed N is high, fluctuations in the d-axis and q-axis current actual values id and iq in the estimation current FB control mode are almost the same as those in the two-phase control mode.

A reason for this is that as shown in FIG. 5C, when the sampling interval Ts is constant regardless of the rotation speed N, the electrical angle change Δθe and the current change Δiw in the sampling interval Ts are relatively large. Therefore, even in the estimation current FB control mode, it is likely that actual information is suitably reflected.

As shown in FIGS. 6A and 6B, when the control mode is switched form the two-phase control mode to the estimation current FB control mode under a condition that the rotation speed N is middle, the fluctuations in the d-axis and q-axis current actual values id and iq in the estimation current FB control mode become greater than those in the two-phase control mode. As a result, the control of the AC motor 2 becomes unstable.

A reason for this is that as shown in FIG. 6C, since the electrical angle change Δθe and the current change Δiw in the sampling interval Ts are smaller than those when the rotation speed N is high, the actual information is reduced.

As shown in FIGS. 7A and 7B, when the control mode is switched form the two-phase control mode to the estimation current FB control mode under a condition that the rotation speed N is low, the fluctuations in the d-axis and q-axis current actual values id and iq in the estimation current FB control mode become greater than those when the rotation speed N is middle. As a result, the control of the AC motor 2 becomes more unstable.

As shown in FIG. 7C, when the rotation speed N is low, the electrical angle change Δθe and the current change Δiw in the sampling interval Ts become almost zero. According to the first embodiment, the U-phase and V-phase current command values iu* and iv* are used as the U-phase and V-phase current estimation values iu_est and iv_est, respectively. Therefore, when the current change Δiw changing with respect to the command becomes almost zero, the d-axis and q-axis current estimation values id_est and iq_est to be fed back change little.

As described above, when the rotation speed N is low, the electrical angle change Δθe and the current change Δiw in the sampling interval Ts become small. In other words, the actual information reflected in the d-axis and q-axis current estimation values id_est and iq_est to be fed back becomes insufficient. As a result, accuracy of the d-axis and q-axis current estimation values id_est and iq_est to be fed back may be reduced.

Figure 8A:
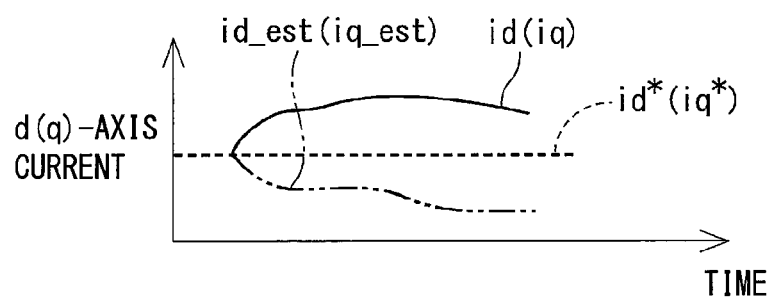
FIGS. 8A, 8B, and 8C are diagrams for explaining a divergence of a current.

As shown in FIG. 8A, when the accuracy of the d-axis current estimation value id_est is reduced, the sign of a difference between the d-axis current command value id* and the d-axis current estimation value id_est may become different from (i.e., opposite to) the sign of a difference between the d-axis current command value id* and the d-axis current actual value id.

If the sign of the difference between the d-axis current command value id* and the d-axis current estimation value id_est to be fed back is different from the sign of the difference between the d-axis current command value id* and the d-axis current actual value id, control is performed in a direction (upper direction in FIG. 8A) so that the difference between the d-axis current command value id* and the d-axis current estimation value id_est can decrease and that the difference between the d-axis current command value id* and the d-axis current actual value id can increase. The same is true for the q-axis current.

Figure 8B:
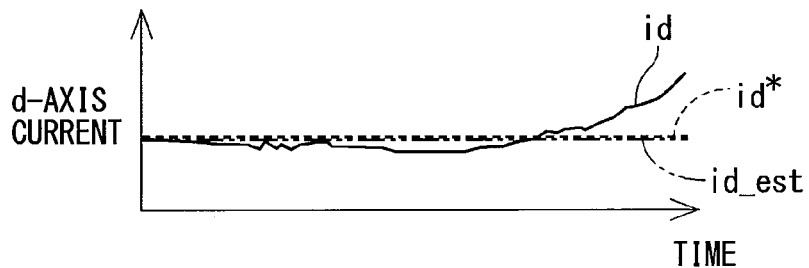
Figure 8C:
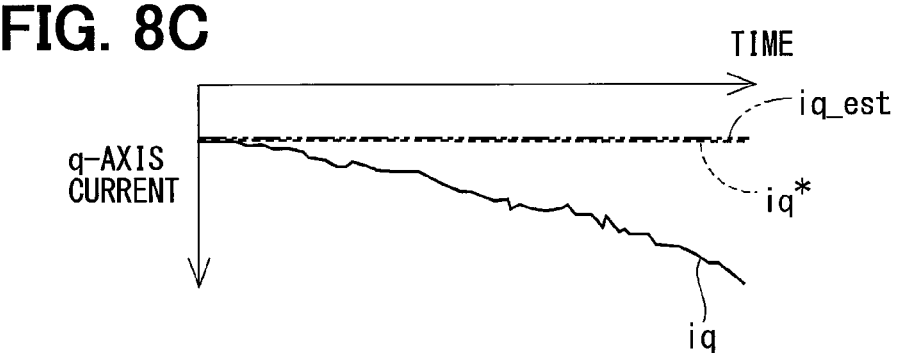

Therefore, as shown in FIG. 8B, when the sign of the difference between the d-axis current command value id* and the d-axis current estimation value id_est to be fed back is different from the sign of the difference between the d-axis current command value id* and the d-axis current actual value id, the control is performed in a direction so that the d-axis current actual value id can deviate from the d-axis current command value id*. If this state continues, the difference between the d-axis current command value id* and the d-axis current actual value id continues to increase, and eventually the d-axis current actual value id diverges.

Likewise, when the sign of the difference between the q-axis current command value iq* and the q-axis current estimation value iq_est to be fed back is different from the sign of the difference between the q-axis current command value iq* and the q-axis current actual value iq, the control is performed in a direction so that the q-axis current actual value iq can deviate from the q-axis current command value iq*. If this state continues, the difference between the q-axis current command value iq* and the q-axis current actual value iq continues to increase, and eventually the q-axis current actual value iq diverges.

Specifically, as shown in FIGS. 9A-9I, when the AC motor 2 is controlled in the estimation current FB control mode under a condition that the rotation speed N is low, the W-phase (i.e., sensor-phase) current iw follows the W-phase current command value iw*, but the U-phase current iu and the V-phase current iv monotonically increase or decrease. Likewise, the d-axis current actual value id and the q-axis current actual value iq monotonically increase or decrease. Accordingly, the d-axis voltage command value vd*, the q-axis voltage command value vq*, the actual torque value trq, and the rotation speed N fluctuates largely, so that the control becomes unstable.

Figure 10A:
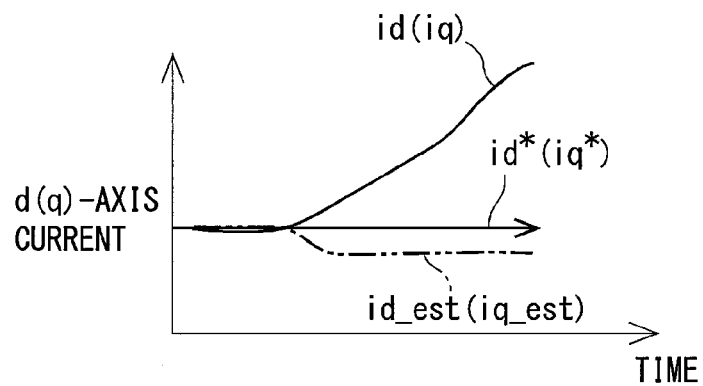
FIGS. 10A and 10B are diagrams for explaining a difference reverse control according to the first embodiment.

That is, as shown in FIG. 10A, the state, where the sign of the difference between the d-axis current command value id* and the d-axis current estimation value id_est to be fed back is different from the sign of the difference between the d-axis current command value id* and the d-axis current actual value id, continues, the d-axis current actual value id diverges eventually. The same is true for the q-axis current.

Figure 10B:
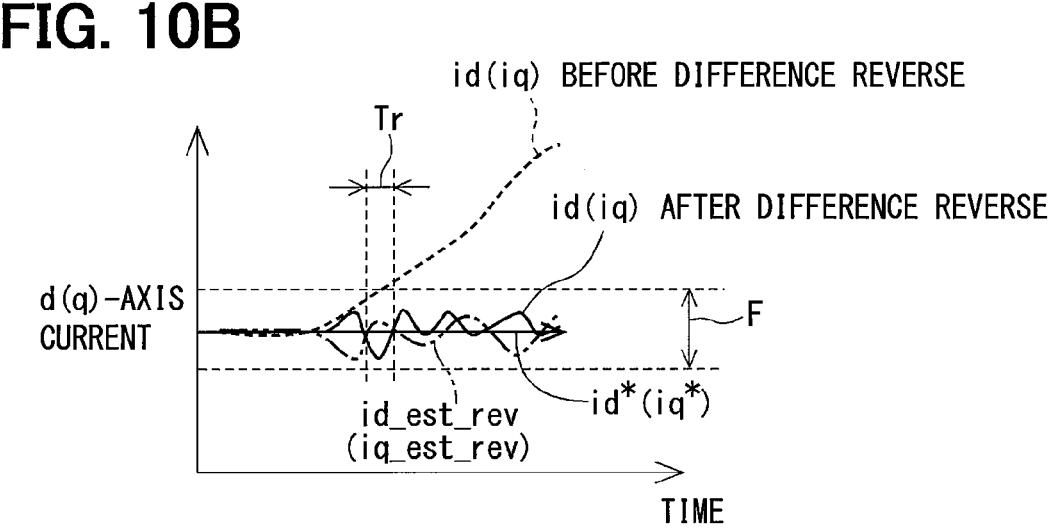

To prevent the d-axis and q-axis current actual values id and iq from diverging, according to the first embodiment, as shown in FIG. 10B, when the rotation speed N is not greater than the first determination threshold A1, the difference reverser 33 reverses the signs of the d-axis and q-axis current differences Δid and Δiq at the reverse interval Tr. As mentioned previously, the d-axis current difference Δid is a difference between the d-axis current estimation value id_est and the d-axis current command value id*, and the q-axis current difference Δiq is a difference between the q-axis current estimation value iq_est and the q-axis current command value iq*.

The reverse interval Tr can be suitably set according to various factors including a responsivity of the AC motor 2 and a characteristic (e.g., gain) of the PI calculation performed by the PI calculator 24. Specifically, the slopes of the d-axis and q-axis current actual values depend on the responsivity of the AC motor 2 and the characteristic of the PI calculation. Therefore, it is preferable that the reverse interval Tr be set by calculation or actual measurement so that the d-axis and q-axis current actual values id and iq can be within a fluctuation allowable range F with respect to the d-axis and q-axis current command value id* and iq*.

The number of updates of the voltage command during one electrical period changes according to a control period Tu and a carrier frequency fc which is a frequency of a triangular wave used to generate the PWM signals. Here, a voltage command update period depends on the control period Tu, and an application voltage pulse period depends on the carrier frequency fc. It is not always necessary that the control period Tu depends on the carrier frequency fc. As the control period Tu becomes longer, a period during which a voltage is applied based on the same voltage command value becomes longer. In addition, as the carrier frequency fc becomes lower, each application voltage pulse period becomes longer. Further, as the rotation speed N becomes greater, one electrical period becomes shorter. Therefore, when the rotation speed N is increased under a condition that the control period Tu remains unchanged, the number of updates of the voltage command during one electrical period is reduced. The same is true for the carrier frequency fc.

For the above reasons, it is preferable that the reverse interval Tr should be variable depending on at least one of the control period Tu, the carrier frequency fc, and the rotation speed N so that the d-axis and q-axis current actual values id and iq can be within the fluctuation allowable range F.

Next, a drive control process for driving the AC motor 2 according to the first embodiment is described with reference to a flowchart shown in FIG. 11. The drive control process is performed by the controller 15. FIG. 12 is a flowchart of a difference reverse procedure included in the drive control process.

Figure 11:
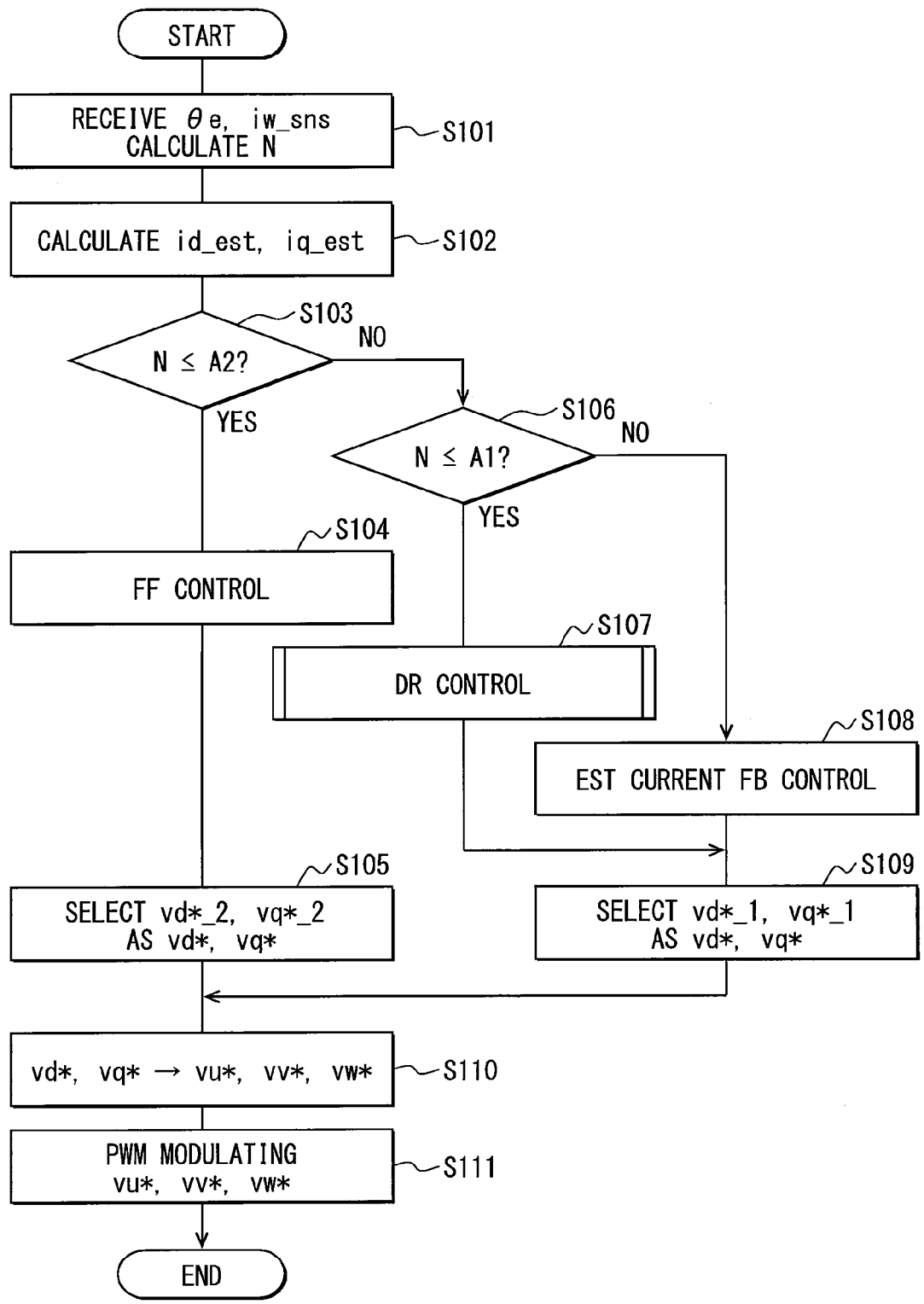
FIG. 11 is a flowchart for explaining a drive control process according to the first embodiment.
Figure 12:
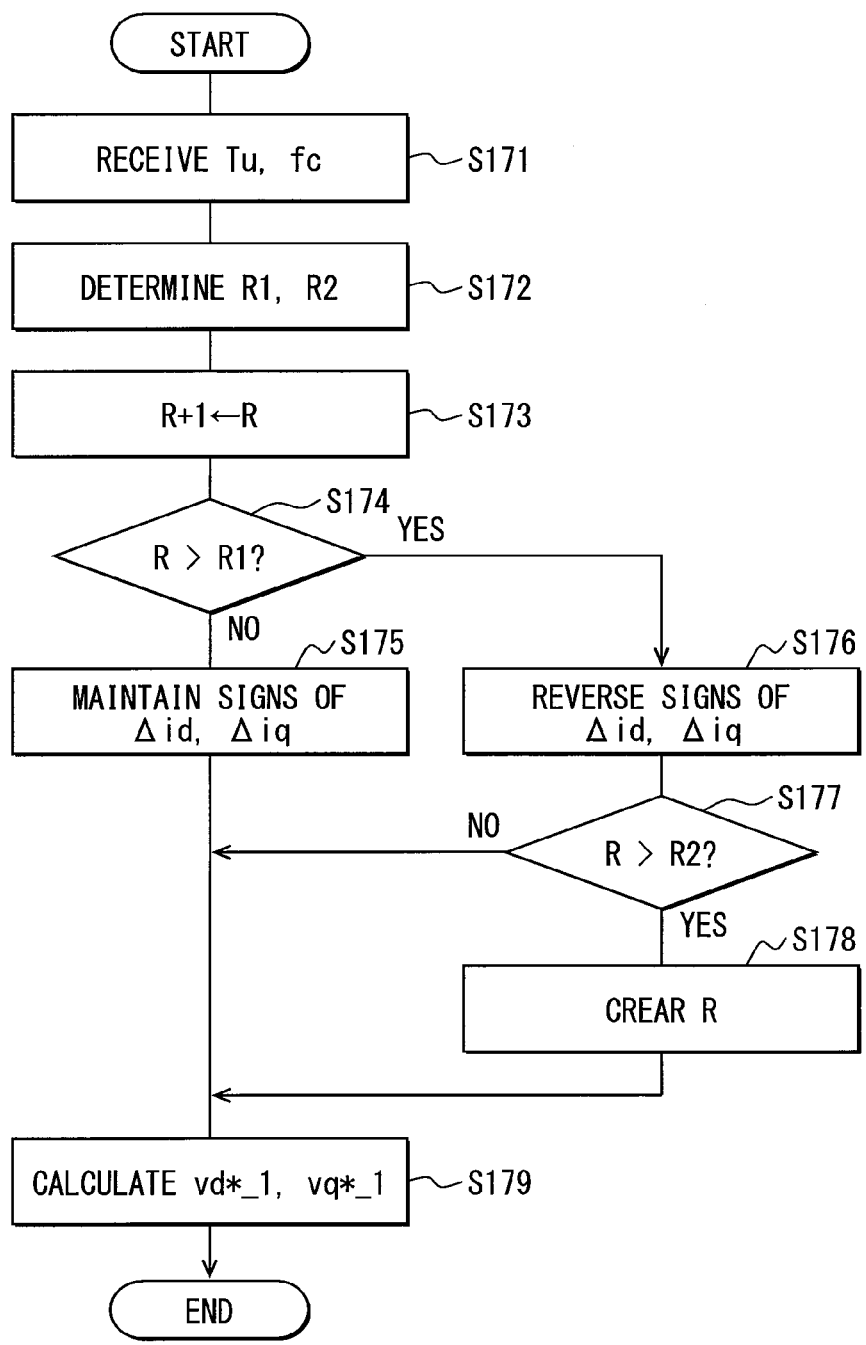
FIG. 12 is a flowchart for explaining a difference reverse control procedure according to the first embodiment.

As shown in FIG. 11, the drive control process starts at S101 where the controller 15 receives the electrical angle θe from the rotation angle sensor 14 and calculates the rotation speed N. Further, at S101, the controller 15 receives the W-phase current detection value iw_sns from the current sensor 13.

Then, at S102, the current estimator 30 calculates the d-axis and q-axis current reference estimation values id_est_ref and iq_est_ref based on the W-phase current detection value iw_sns and the electrical angle θe. Thus, according to the first embodiment, the d-axis and q-axis current reference estimation values id_est_ref and iq_est_ref are always calculated regardless of the rotation speed N.

Then, at S103, it is determined whether the rotation speed N is not greater than the second determination threshold A2. If it is determined that the rotation speed N is greater than the second determination threshold A2 corresponding to NO at S103, the drive control process proceeds to S106. In contrast, if it is determined that the rotation speed N is not greater than the second determination threshold A2 corresponding to YES at S103, the drive control process proceeds to S104.

At S104, the drive mode is switched to the FF control mode, and the second d-axis and q-axis voltage command values vd*_2 and vq*_2 are calculated by the voltage command reference value calculator 25 and the voltage command reference value corrector 26.

Then, at S105, the switch determinator 27 selects the second d-axis and q-axis voltage command values vd*_2 and vq*_2 as the d-axis and q-axis voltage command values vd* and vq* used to calculate the PWM signals UU, UL, VU, VL, WU, and WL.

At S106, to which the drive control process proceeds if it is determined that the rotation speed N is greater than the second determination threshold A2 corresponding to NO at S103, it is determined whether the rotation speed N is not greater than the first determination threshold A1. If it is determined that the rotation speed N is greater than the first determination threshold A1 corresponding to NO at S106, the drive control process proceeds to S108. In contrast, if it is determined that the rotation speed N is not greater than the first determination threshold A1 corresponding to YES at S106, the drive control process proceeds to S107. That is, when A2<N≤A1, the drive control process proceeds to S107.

At S107, the control apparatus performs a difference reverse procedure by switching the drive mode to the DR control mode, where the difference reverser 33 reverses the signs of the d-axis and q-axis current differences Δid and Δiq at the reverse interval Tr.

The difference reverse procedure performed at S107 is described with reference to the flowchart shown in FIG. 12.

As shown in FIG. 12, the difference reverse procedure starts at S171 where the difference reverser 33 receives the control period Tu and the carrier frequency fc as control period information.

Then, at S172, the difference reverser 33 determines first and second control number thresholds R1 and R2 corresponding to the reverse interval Tr based on the control period Tu, the carrier frequency fc, and the rotation speed N. The second control number threshold R2 is larger than the second control number threshold R2. For example, the second control number threshold R2 can be twice larger than the second control number threshold R2.

Then, at S173, the difference reverser 33 increments a count value R of a control number counter.

Then, at S174, the difference reverser 33 determines whether the count value R is greater than the first control number threshold R1. If the difference reverser 33 determines that the count value R is greater than the first control number threshold R1 corresponding to YES at S174, the difference reverse procedure proceeds to S176. In contrast, if the difference reverser 33 determines that the count value R is not greater than the first control number threshold R1 corresponding to NO at S174, the difference reverse procedure proceeds to S175.

At S175, the difference reverser 33 maintains the signs of the d-axis and q-axis current differences Δid and Δiq unchanged. That is, the difference reverser 33 selects the d-axis and q-axis current reference estimation values id_est_ref and the iq_est_ref as the d-axis and q-axis current estimation values id_est and iq_est to be fed back.

At S176, to which the difference reverse procedure proceeds if the difference reverser 33 determines that the count value R is greater than the first control number threshold R1 corresponding to YES at S174, the difference reverser 33 reverses the signs of the d-axis and q-axis current differences Δid and Δiq. That is, the difference reverser 33 selects the d-axis and q-axis current reverse estimation values id_est_rev and the iq_est_rev as the d-axis and q-axis current estimation values id_est and iq_est to be fed back.

At S177, the difference reverser 33 determines whether the count value R is greater than the second control number threshold R2. If the difference reverser 33 determines that the count value R is not greater than the second control number threshold R2 corresponding to NO at S177, the difference reverse procedure proceeds to S179. In contrast, if the difference reverser 33 determines that the count value R is greater than the second control number threshold R2 corresponding to YES at S177, the difference reverse procedure proceeds to S178.

At S178, the difference reverser 33 resets the count value R.

At S179, the PI calculator 24 calculates the first d-axis and q-axis voltage command values vd*_1 and vq*_1 by PI calculation so that the d-axis and q-axis current differences Δid and Δiq can converge to zero. In this case, if the last control mode was the FF control mode, it is preferable that the last d-axis and q-axis voltage command values vd* and vq* be set as initial values of the PI integral term in the PI calculation. In such an approach, sudden changes in the d-axis and q-axis voltage command values vd* and vq* occurring when the control mode is switched from the FF control mode to the current FB mode can be reduced or prevented.

After S179, the difference reverse procedure is ended.

Returning to FIG. 11, at S108, to which the drive control process proceeds if it is determined that the rotation speed N is greater than the first determination threshold A1 corresponding to NO at S106, the subtractor 22 calculates the d-axis and q-axis current differences Δid and Δiq, and the first d-axis and q-axis voltage command values vd*_1 and vq*_1 are calculated without reversing the signs of the d-axis and q-axis current differences Δid and Δiq by the difference reverser 23.

After the S107 or S108, the drive control process proceeds to S109 where the first d-axis and q-axis voltage command values vd*_1 and vq*_1 are selected as the d-axis and q-axis voltage command values vd* and vq* used to calculate the PWM signals UU, UL, VU, VL, WU, and WL.

After the S105 or S109, the drive control process proceeds to S110 where the three-phase voltage command value calculator 28 performs inverse dq transformation based on the electrical angle θe received from the rotation angle sensor 14 so that the d-axis and q-axis voltage command values vd* and vq* can be converted to the three-phase voltage command values vu*, vv*, and vw*.

At S111, the PWM signal generator 29 calculates the PWM signals UU, UL, VU, VL, WU, and WL by PWM-modulating the three-phase voltage command values vu*, vv*, and vw* based on the inverter input voltage VH and outputs the PWM signals UU, UL, VU, VL, WU, and WL to the inverter 12.

The switching devices of the inverter 12 are turned ON and OFF based on the PWN signals UU, UL, VU, VL, WU, and WL so that the three-phase AC voltages vu, vv, and vw can be generated. The three-phase AC voltages vu, vv, and vw are applied to the AC motor 2 so that the AC motor 2 can output torque corresponding to the torque command value trq*.

FIGS. 13A-13F show a behavior of the AC motor 2 observed when the AC motor 2 is controlled in the DR control mode during an increase in the rotation speed N from the second determination threshold A2 to the first determination threshold A1. FIGS. 14A-14F show a behavior of the AC motor 2 observed when the AC motor 2 is controlled in the DR control mode during a decrease in the rotation speed N from the first determination threshold A1 to the second determination threshold A2. FIGS. 13A and 14A represent a torque, FIGS. 13B and 14B represent a rotation speed, FIGS. 13C and 14C represent a d-axis current, FIGS. 13D and 14D represent a q-axis current, FIGS. 13E and 14E represent a d-axis voltage, and FIGS. 13F and 14F represent a q-axis voltage. In FIGS. 13A-13F and FIGS. 14A-14F, a solid line represents an actual value, a broken line represents a command value, and a chain double-dashed line represents an estimation value.

Since the signs of the d-axis and q-axis current differences Δid and Δiq are reversed at the reverse interval Tr, the d-axis and q-axis voltage command values vd* and vq* are relatively stably controlled as shown in FIGS. 13E and 13F. Therefore, as shown in FIGS. 13C and 13D, the d-axis and q-axis current actual values id and iq change to follow the d-axis and q-axis current command values id* and iq* without repeating monotonic increase and decrease unlike those shown in FIGS. 9C and 9D. Likewise, since the actual torque trq changes to follow the torque command value trq*, the AC motor 2 is stably controlled during the increase in the rotation speed N from the second determination threshold A2 to the first determination threshold A1.

Likewise, as shown in FIGS. 14A-14F, the AC motor 2 is almost stably controlled during the decrease in the rotation speed N from the first determination threshold A1 to the second determination threshold A2.

As described above, the motor control apparatus 10 controls the three-phase AC motor 2 to which the three-phase AC voltages vu, vv, and vw controlled by the inverter 12 is applied.

The procedures performed in the controller 15 of the motor control apparatus 10 can be summarized as follows. The current detection value iw_sns is received from the current sensor 13 which is provided to any one of the phases (e.g., W-phase in the first embodiment) of the AC motor 2 (at S101 in FIG. 11). Further, the electrical angle θe is received from the rotation angle sensor 14 (at S101) which detects a rotation angle of the AC motor 2.

The rotation speed calculator 16 calculates the rotation speed N of the AC motor 2 based on the electrical angle θe (at S101).

The current estimator 30 calculates the d-axis and q-axis current reference estimation values id_est_ref and iq_est_ref based on the W-phase current detection value iw_sns and the electrical angle θe (at S102). According to the first embodiment, the d-axis and q-axis current reference estimation values id_est_ref and iq_est_ref are calculated based on the d-axis and q-axis current command values id* and iq* in addition to the W-phase current detection value iw_sns and the electrical angle θe.

The subtractor 22 calculates the d-axis and q-axis current differences Δid and Δiq between the d-axis and q-axis current estimation values id_est and iq_est, which are fed back from the current estimator 30, and the d-axis and q-axis current command values id* and iq*, which are related to driving of the AC motor 2 (at S108, S175, S176).

The PI calculator 24 calculates the first d-axis and q-axis voltage command values vd*_1 and vq*_1, which are used to calculate the PWM signals UU, UL, VU, VL, WU, and WL for driving of the AC motor 2, based on the d-axis and q-axis current differences Δid and Δiq (at S108, S179)

According to the first embodiment, when the rotation speed N is not greater than the first determination threshold A1, the signs of the d-axis and q-axis current differences Δid and Δiq used to calculate the first d-axis and q-axis voltage command values vd*_1 and vq*_1 are reversed at the reverse interval Tr (at S175, S176). Specifically, the difference reverser 33 alternately selects the d-axis and q-axis current reference estimation values id_est_ref and iq_est_ref or the d-axis and q-axis current reverse estimation values id_est_rev and iq_est_rev at the reserve interval Tr as the d-axis and q-axis current estimation values id_est and iq_est to be fed back. Thus, the signs of the d-axis and q-axis current differences Δid and Δiq calculated by the subtractor 22 are reversed at the reverse interval Tr.

Since the d-axis and q-axis current estimation values id_est and iq_est are fed back so that the signs of the d-axis and q-axis current differences Δid and Δiq can be reversed at the reverse interval Tr, there is no need to change the calculations in the current command value calculator 21, the subtractor 22, and the PI calculator 24. Therefore, the first embodiment can be easily applied to a case where the current command value calculator 21, the subtractor 22, and the PI calculator 24 are implemented by hardware.

According to the first embodiment, the current sensor 13 is provided to the W-phase, and no current sensor is provided to the U-phase and the W-phase. Thus, the number of current sensors used in the motor control apparatus 10 is reduced. Accordingly, the size of the inverter 12 near its output terminals is reduced, and the cost of the motor control apparatus 10 is reduced.

In the current estimation FB control mode, where the AC motor 2 is controlled by feeding back the d-axis and q-axis current estimation values id_est and iq_est estimated based on the current detection value iw_sns of one phase (e.g., W-phase in the first embodiment) of the AC motor 2, when the rotation speed N is low, the electrical angle change Δθe and the current change Δiw in the sampling interval Ts become small. Accordingly, less actual information may be reflected, so that the control of the AC motor 2 may become unstable. In particular, if the state, where the sign of the difference between the d-axis current command value id* and the d-axis current estimation value id_est to be fed back is different from the sign of the difference between the d-axis current command value id* and the d-axis current actual value id, continues, the d-axis current actual value id does not converge to the d-axis current command value id* and eventually diverges. Likewise, if the state, where the sign of the difference between the q-axis current command value iq* and the q-axis current estimation value iq_est to be fed back is different from the sign of the difference between the q-axis current command value iq* and the q-axis current actual value iq, continues, the q-axis current actual value iq does not converge to the q-axis current command value iq* and eventually diverges.

When the rotation speed N is low, the electrical angle change Δθe and the current change Δiw in the sampling interval Ts become small. When the electrical angle change Δθe and the current change Δiw in the sampling interval Ts become small, the d-axis and q-axis current estimation values id_est and iq_est to be fed back change little. Therefore, if the state, where the sign of the difference between the d-axis current command value id* and the d-axis current estimation value id_est to be fed back is different from the sign of the difference between the d-axis current command value id* and the d-axis current actual value id, the difference between the d-axis current command value id* and the d-axis current actual value id continues to increase, and eventually the d-axis current actual value id diverges. Likewise, if the state, where the sign of the difference between the q-axis current command value iq* and the q-axis current estimation value iq_est to be fed back is different from the sign of the difference between the q-axis current command value iq* and the q-axis current actual value iq, the difference between the q-axis current command value iq* and the q-axis current actual value iq continues to increase, and eventually the q-axis current actual value iq diverges.

To prevent the d-axis and q-axis current actual values id and iq from diverging, according to the first embodiment, when the rotation speed N is not greater than the first determination threshold A1, the signs of the d-axis and q-axis current differences Δid and Δiq are reversed at the reverse interval Tr. This approach prevents the state, where the sign of the difference between the d-axis current command value id* and the d-axis current estimation value id_est to be fed back is different from the sign of the difference between the d-axis current command value id* and the d-axis current actual value id, from continuing and also prevents the state, where the sign of the difference between the q-axis current command value iq* and the q-axis current estimation value iq_est to be fed back is different from the sign of the difference between the q-axis current command value iq* and the q-axis current actual value iq, from continuing. Thus, this approach prevents the d-axis current actual value id from continuing to increase and diverging and also prevents the q-axis current actual value iq from continuing to increase and diverging. Therefore, even when the rotation speed N is low, the AC motor 2 can be stably controlled in the current FB control mode based on the current detection value of one phase (the W-phase current detection value iw_sns in the first embodiment).

According to the first embodiment, the reverse interval Tr can vary depending on at least one of the carrier frequency fc, the control period Tu, and the rotation speed N. In such an approach, the d-axis and q-axis current actual values id and iq can be suitably controlled to be within the fluctuation allowable range F with respect to the d-axis and q-axis current command value id* and iq*. Therefore, the divergences of the d-axis and q-axis current actual values id and iq can be surely prevented.

Further, according to the first embodiment, the voltage command reference value calculator 25 and the voltage command reference value corrector 26 work together to calculate the second d-axis and q-axis voltage command values vd*_2 and vq*_2, which are used to calculate the PWM signals UU, UL, VU, VL, WU, and WL, based on the d-axis and q-axis current command values id* and iq* (at S104).

Further, the switch determinator 27 switches the drive mode of the AC motor 2 between the current FB control mode, where the PWM signals UU, UL, VU, VL, WU, and WL are generated based on the first d-axis and q-axis voltage command values vd*_1 and vq*, and the FF control mode, where the PWM signals UU, UL, VU, VL, WU, and WL are generated based on the second d-axis and q-axis voltage command values vd*_2 and vq*_2.

According to the first embodiment, when the rotation speed N is greater than the second determination threshold A2, the drive mode is switched to the current FB control mode (NO at S103), and when the rotation speed N is not greater than the second determination threshold A2, the drive mode is switched to the FF control mode (YES at S103). Specifically, when the rotation speed N is greater than the second determination threshold A2 (NO at S103), the switch determinator 27 selects the first d-axis and q-axis voltage command values vd*_1 and vq*_1 as the d-axis and q-axis voltage command values vd* and vq* (at S109). In contrast, when the rotation speed N is not greater than the second determination threshold A2 (YES at S103), the switch determinator 27 selects the second d-axis and q-axis voltage command values vd*_2 and vq*_2 as the d-axis and q-axis voltage command values vd* and vq* (at S105).

According to the first embodiment, when the rotation speed N is not greater than the second determination threshold A2, the FF control mode is used instead of the current FB control mode, and the second d-axis and q-axis voltage command values vd*_2 and vq*_2 are calculated based on the d-axis and q-axis current command values id* and iq*. In such an approach, the AC motor 2 can be stably started up, driven, and stopped even when the rotation speed N is low.

In particular, according to the first embodiment, the second d-axis and q-axis voltage command values vd*_2 and vq*_2 are calculated by correcting the d-axis and q-axis voltage command reference values vd_ref and vq_ref, which are calculated based on the d-axis and q-axis current command values id* and iq* using the voltage equations as a theoretical formula for a motor, based on the d-axis and q-axis voltage command correction values vd_cmp and vq_cmp, which correspond to the differences between the theoretical voltage command reference values and the voltage command values necessary for the AC motor 2 to actually output torque corresponding to the torque command value trq*. Thus, the AC motor 2 can be more stably started up, driven, and stopped even when the rotation speed N is low.

Correspondence between terms used in the first embodiment and claims is as follows. The controller 15 corresponds to a current receiver, a rotation angle receiver, a rotation speed calculator, a current estimator, a difference calculator, a first voltage command value calculator, a difference reverser, a second voltage command value calculator, and a control mode switch. Specifically, the current estimator 30 corresponds to a current estimator, the subtractor 22 corresponds to a difference calculator, the PI calculator 24 corresponds to a first voltage command value calculator, the difference reverser 33 corresponds to a difference reverser, the voltage command reference value corrector 26 corresponds to a second voltage command value calculator, and the switch determinator 27 corresponds to a control mode switch.

S101 in FIG. 11 corresponds to a procedure as functions of a current receiver, a rotation angle receiver, and a rotation speed calculator. S102 corresponds to a procedure as a current estimator. S179 and S108 correspond to procedures as functions of a difference calculator and a first voltage command value calculator. S175 and S176 correspond to procedures as functions of a difference reverser. S104 corresponds to a procedure as a function of a second voltage command value calculator. S105 and S109 correspond to procedures as functions of a control mode switch.

The W-phase corresponds to a sensor-phase. The W-phase current detection value iw_sns corresponds to a current detection value. The electrical angle θe corresponds to a rotation angle detection value. The d-axis and q-axis current reference estimation values id_est_ref and iq_est_ref correspond to a current estimation value. The d-axis and q-axis current command values id* and iq* correspond to a current command value. The d-axis and q-axis current differences Δid and Δiq correspond to a difference. The first d-axis and q-axis voltage command values vd*_1 and vq*_1 correspond to a first voltage command value. The second d-axis and q-axis voltage command values vd*_2 and vq*_2 correspond to a second voltage command value. The PWM signals UU, UL, VU, VL, WU, and WL correspond to a drive signal.

Second Embodiment

A second embodiment of the present disclosure is described below with reference to FIG. 15. The second embodiment differs from the first embodiment in a difference reverser.

In the first embodiment, the d-axis and q-axis current estimation values id_est and iq_est are fed back to the subtractor 22 so that the signs of the d-axis and q-axis current differences Δid and Δiq can be reversed at the reverse interval Tr. In contrast, in the second embodiment, the signs of the d-axis and q-axis current differences Δid and Δiq are directly reversed.

Figure 15:
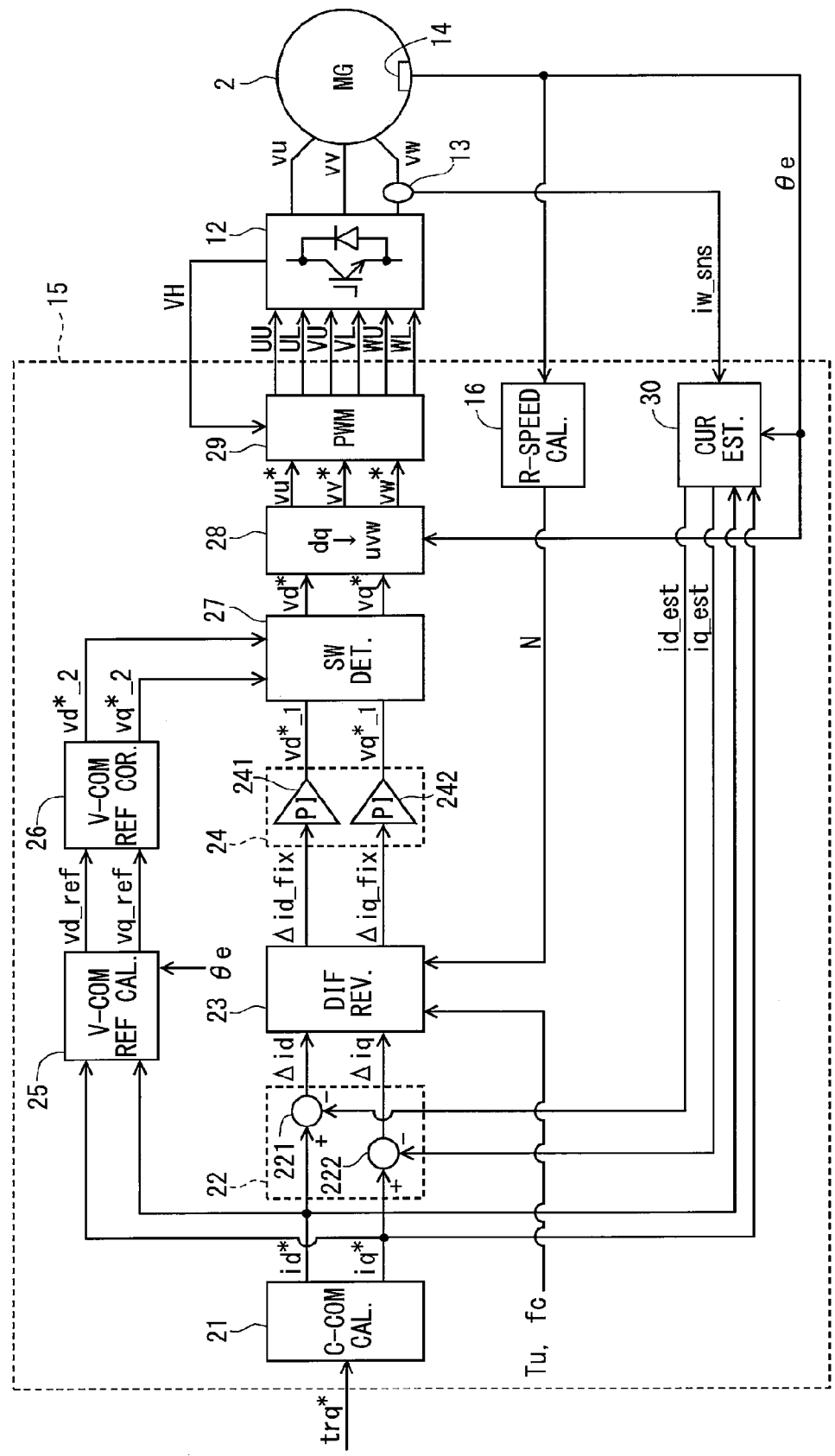
FIG. 15 is a block diagram of a controller according to a second embodiment of the present disclosure.

Specifically, as shown in FIG. 15, a difference reverser 23 is interposed between the subtractor 22 and the PI calculator 24.

According to the second embodiment, the d-axis and q-axis current estimation values id_est and iq_est calculated by the current estimator 30 are directly inputted to the subtractor 22. The d-axis and q-axis current estimation values id_est and iq_est of the second embodiment are equivalent to the d-axis and q-axis voltage command reference values vd_ref and vq_ref of the first embodiment.

The subtractor 22 calculates the d-axis and q-axis current differences Δid and Δiq.

When the rotation speed N is not greater than the first determination threshold A1, the difference reverser 23 calculates d-axis and q-axis current difference fixed values Δid fix and Δiq fix by reversing the signs of the d-axis and q-axis current differences Δid and Δiq at the reverse interval Tr. In contrast, when the rotation speed N is greater than the first determination threshold A1, the difference reverser 23 calculates the d-axis and q-axis current difference fixed values Δid fix and Δiq fix without reversing the signs of the d-axis and q-axis current differences Δid and Δiq.

The d-axis PI calculator 241 calculates a first d-axis voltage command value vd*_1 by PI calculation so that the d-axis current difference fixed value Δid fix can converge to zero [A], thereby causing the d-axis current estimation value id_est to follow the d-axis current command value id*. The q-axis PI calculator 242 calculates a first q-axis voltage command value vq*_1 by PI calculation so that the q-axis current difference fixed value Δiq fix can converge to zero [A], thereby causing the q-axis current estimation value iq_est to follow the q-axis current command value iq*.

A drive control process according to the second embodiment differs from that according to the first embodiment in the following points.

At S175 in the flowchart in FIG. 12, the subtractor 22 calculates the d-axis and q-axis current differences Δid and Δiq, and the signs of the d-axis and q-axis current differences Δid and Δiq are not reversed. That is, the difference reverser 23 outputs the d-axis and q-axis current differences Δid and Δiq as the d-axis and q-axis current difference fixed values Δid fix and Δiq fix to the PI calculator 24 without reversing the signs of the d-axis and q-axis current differences Δid and Δiq.

At S176, the subtractor 22 calculates the d-axis and q-axis current differences Δid and Δiq, and the signs of the d-axis and q-axis current differences Δid and Δiq are reversed. That is, the difference reverser 23 outputs the d-axis and q-axis current differences Δid and Δiq as the d-axis and q-axis current difference fixed values Δid fix and Δiq fix to the PI calculator 24 by reversing the signs of the d-axis and q-axis current differences Δid and Δiq.

At S179, the PI calculator 24 calculates the first d-axis and q-axis voltage command values vd*_1 and vq*_1 by PI calculation so that the d-axis and q-axis current difference fixed values Δid fix and Δiq fix can converge to zero. Like in the first embodiment, if the last control mode was the FF control mode, it is preferable that the last d-axis and q-axis voltage command values vd* and vq* be set as initial values of the PI integral term in the PI calculation.

Correspondence between terms used in the second embodiment and claims is as follows. The difference reverser 23 of the controller 15 corresponds to a difference reverser. S175 and S176 instead of S179 correspond to procedures as a function of a difference calculator. The d-axis and q-axis current estimation values id_est and iq_est calculated by the current estimator 30 correspond to a current estimation value.

Third Embodiment

A third embodiment of the present disclosure is described below with reference to FIGS. 16-21. The third embodiment differs from the preceding embodiments as follows.

In the preceding embodiments, when the rotation speed N is not greater than the second determination threshold A2, the control mode of the AC motor 2 is switched from the current FB control mode to the FF control mode. The present inventors have found out that the motor 2 can be started up even in the current FB control mode depending on a phase angle θi of a current command vector i*. Based on the findings, in the third embodiment, even when the rotation speed N is not greater than the second determination threshold A2, the current FB control mode is used under a condition that the phase angle θi of the current command vector i* is within a start-up allowable range P.

A first case where the AC motor 2 can be started up in the current FB control mode and a second case where the AC motor 2 cannot be started up in the current FB control mode are described below.

Figure 16:
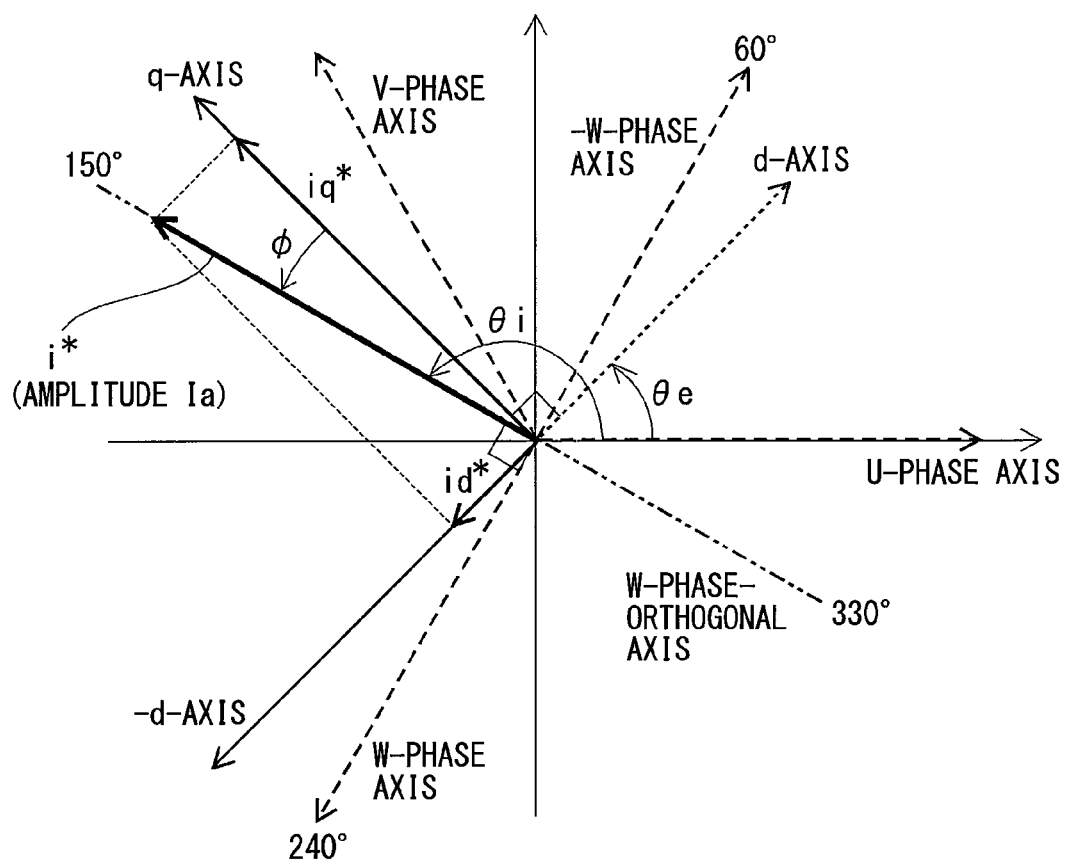
FIG. 16 is a diagram for explaining a phase angle of a current command vector according to a third embodiment of the present disclosure.

Firstly, the phase angle θi of the current command vector i* is described based on FIG. 16.

As shown in FIG. 16, according to the third embodiment, the electrical angle θe is measured with respect to a U-phase axis as 0° in a counterclockwise direction. A W-phase axis is shifted from the U-phase axis by an electrical angle of 240°. The phase angle θi of the current command vector i* with respect to the U-phase axis is given by the following formula (9).

$$\theta i = \theta e + \phi + 90° \tag{9}$$

When a reference axis is not specified, the formula (9) can be generalized to the following formula (10), where C represents a constant.

$$\theta i = \theta e + \phi + C \tag{10}$$

FIGS. 17A-17E show a first example where the current command vector i* is located at a position close to the W-phase axis, and FIGS. 18A-18E show a second example where the current command vector i* is located at a position close to a W-phase-orthogonal axis orthogonal to the W-phase axis. In each of the first and second examples, the AC motor 2 is started up in the FB control mode from a state where the rotation number N is zero [rpm].

Figure 17A:
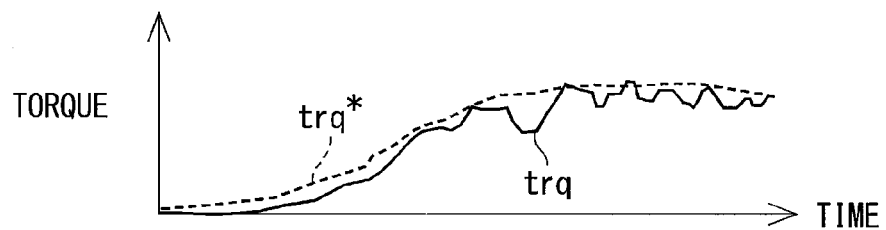
FIGS. 17A, 17B, 17C, 17D, and 17E are timing diagrams for explaining an example where an AC motor can be started up in an estimation current FB control mode.
Figure 17B:
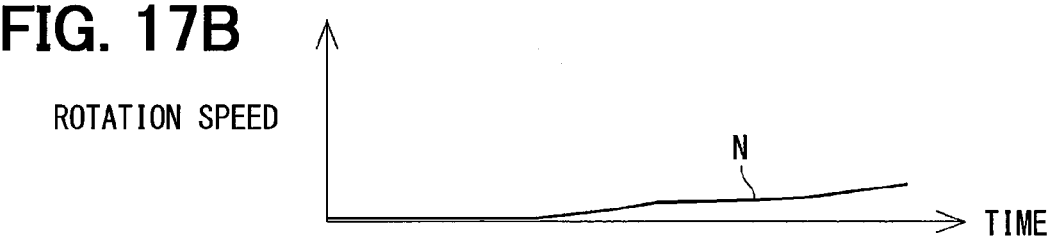
Figure 17C:
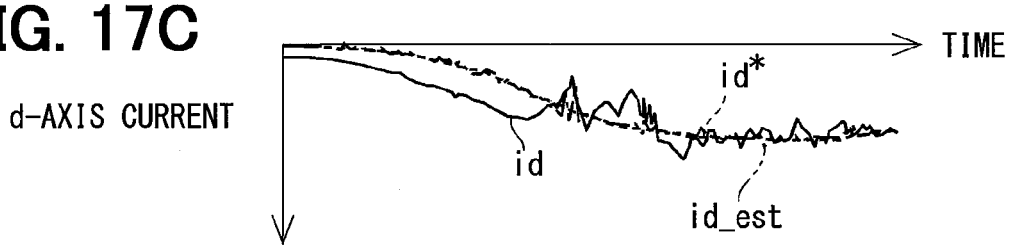
Figure 17D:
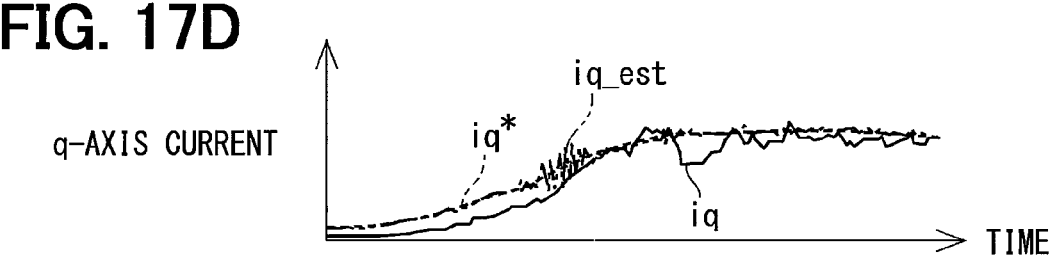
Figure 17E:
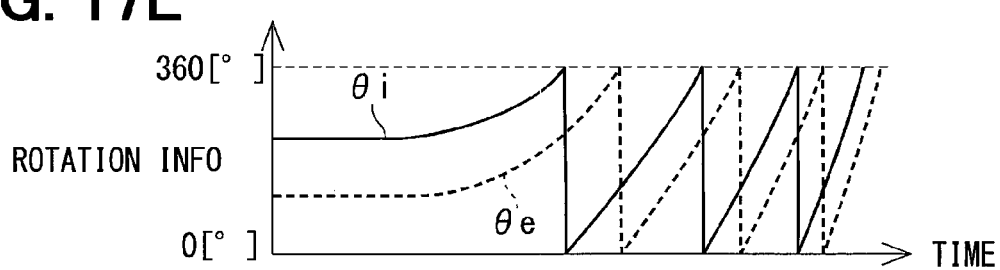
Figure 18A:
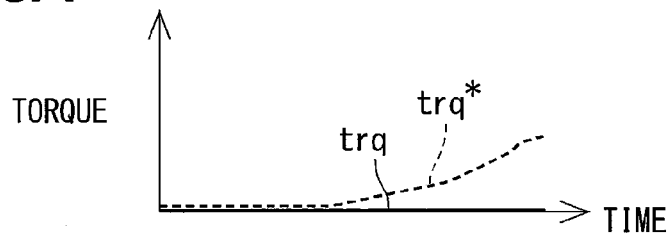
FIGS. 18A, 18B, 18C, 18D, and 18E are timing diagrams for explaining an example where the AC motor cannot be started up in the estimation current FB control mode.
Figure 18B:
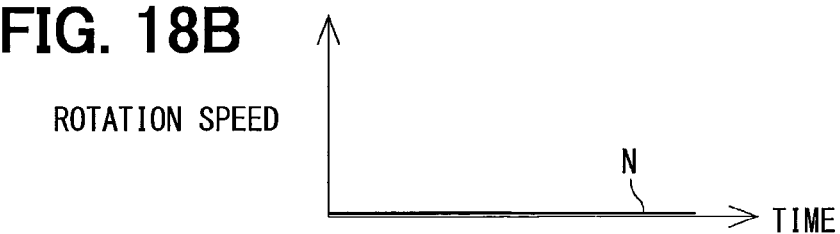
Figure 18C:
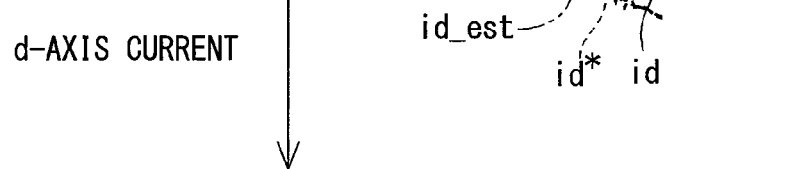
Figure 18D:
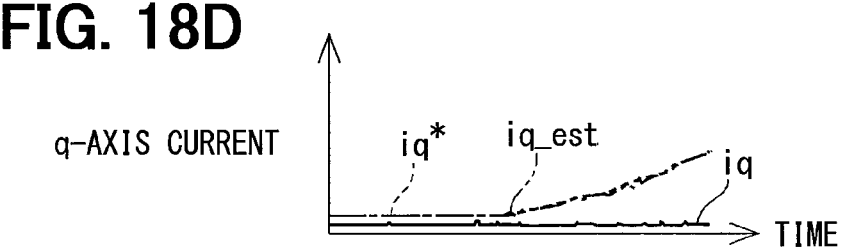
Figure 18E:
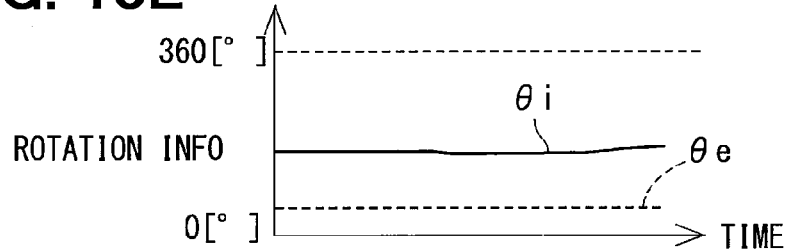

FIGS. 17A and 18A represent a torque, FIGS. 17B and 18B represent a rotation speed, FIGS. 17C and 18C represent a d-axis current, FIGS. 17D and 18D represent a q-axis current, and FIGS. 17E and 18E represent rotation information. In FIGS. 17A-17D and FIGS. 18A-18D, a solid line represents an actual value, a broken line represents a command value, and a chain double-dashed line represents an estimation value. In FIGS. 17E and 18E, a solid line represents the phase angle θi, and a broken line represents the electrical angle θe.

As shown in FIGS. 17C and 17D, in the first example where the current command vector i* is located at a position close to the W-phase axis, the d-axis and q-axis current actual values id* and iq* flowing through the AC motor 2 almost follow the d-axis and q-axis current command values id* and iq*. Accordingly, as shown in FIG. 17A, the actual torque trq outputted from the AC motor 2 almost follow the torque command value trq*. Thus, the AC motor 2 can be started up (refer to FIGS. 17B and 17E).

In contrast, as shown in FIGS. 18A, 18C, and 18D, in the second example where the current command vector i* is located at a position close to the W-phase-orthogonal axis orthogonal to the W-phase axis, even when the torque command value trq* and the d-axis and q-axis current command values id* and iq* increase, the d-axis and q-axis current actual values id and iq remain almost zero. Accordingly, the actual torque value trq remains almost zero [Nm]. Therefore, no torque is generated, so that the AC motor 2 cannot be started up.

When the current command vector i is on the W-phase-orthogonal axis, the W-phase current command value iw*, which is a W-phase axis component of the current command vector i*, becomes zero [A]. Accordingly, the W-phase current detection value iw_sns becomes zero [A]. As a result, the d-axis current estimation value id_est is calculated based on the U-phase and V-phase current command values iu* and iv*. When the d-axis current estimation value id_est, which is calculated based on only the command values, is fed back, the d-axis current difference Δid becomes zero [A], so that the d-axis voltage command value vd* becomes zero. Likewise, when the W-phase current detection value iw_sns becomes zero, and the q-axis current estimation value id_est, which is calculated based on only the command values, is fed back, the q-axis current difference Δiq becomes zero [A], so that the q-axis voltage command value vq* becomes zero. When the d-axis and q-axis voltage command values vd* and vq* become zero, no voltage is applied to the AC motor 2, so that the AC motor 2 cannot be started up.

When the current command vector i* is not on, but close to the W-phase-orthogonal axis, W-phase components of the d-axis and q-axis current estimation values id_est and id_est are small, so that estimation accuracy of the d-axis and q-axis current estimation values id_est and id_est may be reduced. As described in the first embodiment, when the estimation accuracy of the d-axis current estimation value id_est is reduced, and the state, where the sign of the difference between the d-axis current command value id* and the d-axis current estimation value id_est to be fed back is different from the sign of the difference between the d-axis current command value id* and the d-axis current actual value id, contin-ues, the d-axis current actual value id eventually diverges. Likewise, when the estimation accuracy of the q-axis current estimation value iq_est is reduced, and the state, where the sign of the difference between the q-axis current command value iq* and the q-axis current estimation value iq_est to be fed back is different from the sign of the difference between the q-axis current command value iq* and the q-axis current actual value iq, continues, the q-axis current actual value iq eventually diverges. As a result, there may arise a possibility that the AC motor 2 cannot be started up.

In contrast, when the current command vector i* is on or close to the W-phase axis, the W-phase components of the d-axis and q-axis current estimation values id_est and id_est are large. Accordingly, since the d-axis and q-axis current estimation values id_est and id_est are relatively accurately calculated, the AC motor 2 can be started up even in the estimation current FB control mode.

Figure 19:
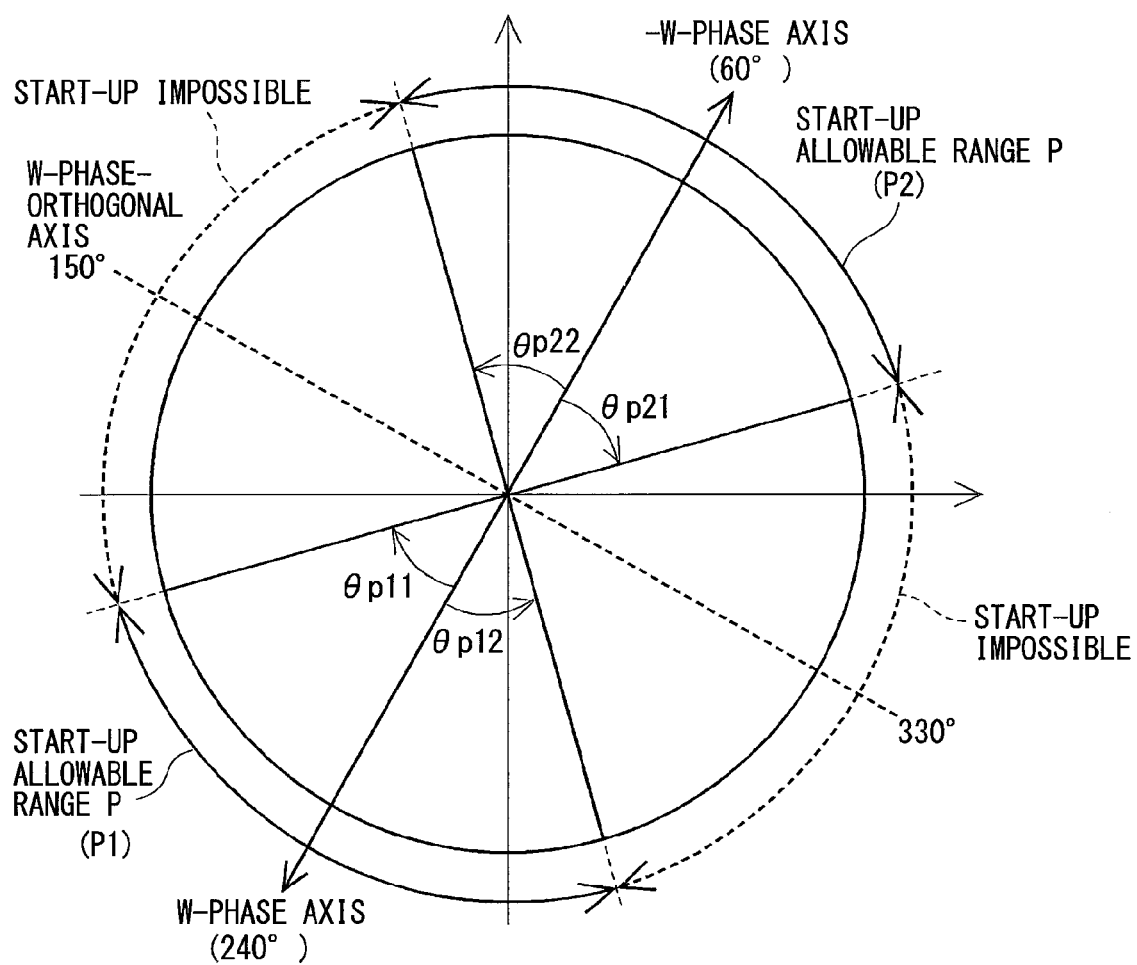
FIG. 19 is a diagram for explaining a start-up allowable range according to the third embodiment.

For the above reason, according to the third embodiment, as shown in FIG. 19, the start-up allowable range P is set for the phase angle θi of the current command vector i*. When the phase angle θi is within the start-up allowable range P, the AC motor 2 is controlled in the current FB control mode even if the rotation speed N is not greater than the second determination threshold A2. In contrast, when the phase angle θi is outside the start-up allowable range P, the AC motor 2 is controlled in the FF control mode until the rotation speed N reaches the second determination threshold A2. According to the third embodiment, as shown in FIG. 19, the start-up allowable range P includes a first start-up allowable range P1 and a second start-up allowable range P2.

The first start-up allowable range P1 is defined as follows with reference to 240° corresponding to the W-phase axis: 240°−θp11≤θi<240°+θp12. The second start-up allowable range P2 is defined as follows with reference to 60° corresponding to the −W-phase axis: 60°−θp21≤θi<60°+θp22. The angles θp11, θp12, θp21, and θp22 can be set equal to each other. Alternatively, the angles θp11, θp12, θp21, and θp22 can be set different from each other based on experiment results or the like.

Figure 20:
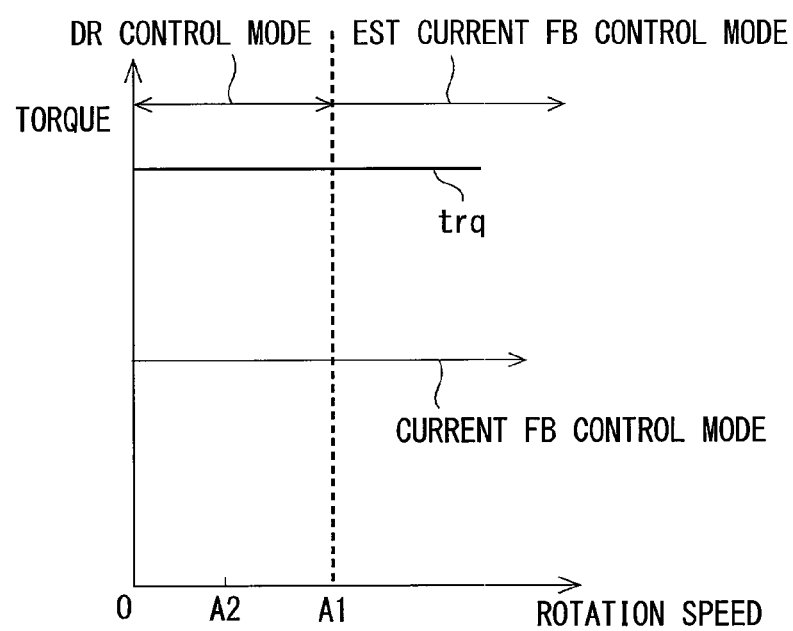
FIG. 20 is a diagram for explaining a switching of a control mode of the AC motor based on a rotation speed of the AC motor according to the third embodiment.

Next, a method of switching the control mode of the AC motor 2 according to the third embodiment is described by comparing FIG. 20 with FIG. 4 which is explained in the first embodiment. As shown in FIG. 20, when the phase angle θi is within the start-up allowable range P, the drive mode of the AC motor 2 is set in the current FB control mode even if the rotation speed N is not greater than the second determination threshold A2. When the phase angle θi is within the start-up allowable range P, the drive mode is set in the DR control mode if the rotation speed N is not greater than the first determination threshold A1, and the drive mode is set in the estimation current FB control mode if the rotation speed N is greater than the first determination threshold A1.

In contrast, when the phase angle θi is outside the start-up allowable range P, the control mode is set as shown in FIG. 4. That is, the drive mode is set in the FF control mode, if the rotation speed N is not greater than the second determination threshold A2. The drive mode is set in the DR control mode, if the rotation speed N is greater than the second determination threshold A2 but not greater than the first determination threshold A1. The drive mode is set in the current estimation FB control mode, if the rotation speed N is greater than the first determination threshold A1.

A method of reversing the signs of the d-axis and q-axis current differences Δid and Δiq in the DR control mode can be the same as that described in the first embodiment or the second embodiment.

Figure 21:
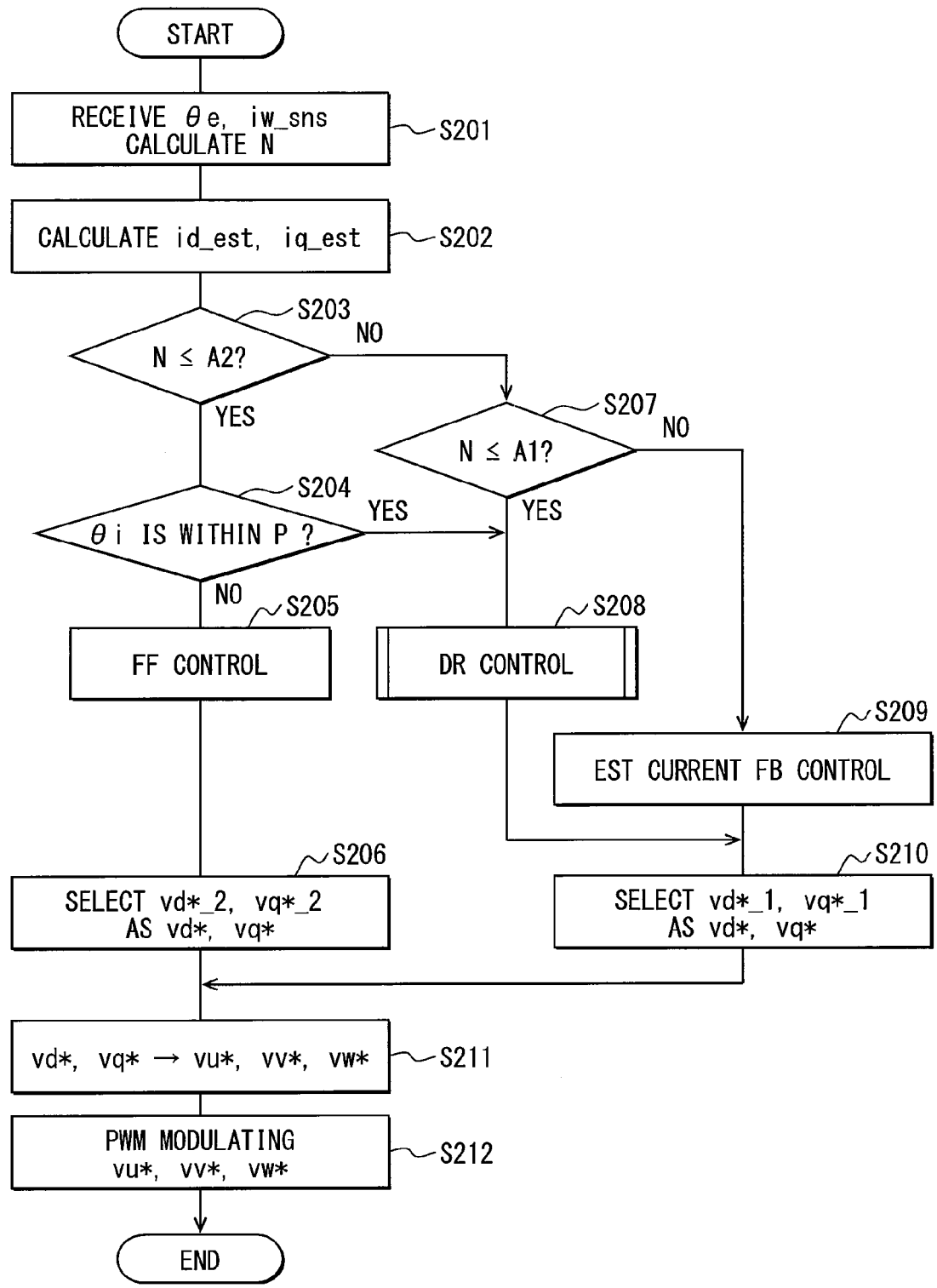
FIG. 21 is a flowchart for explaining a drive control process according to the third embodiment.

Next, a drive control process according to the third embodiment is described below with reference to FIG. 21. Procedures performed at S201 and S202 are the same as the procedures performed at S101 and S102, respectively.

At S203, it is determined whether the rotation speed N is not greater than the second determination threshold A2. If it is determined that the rotation speed N is greater than the second determination threshold A2 corresponding to NO at S203, the drive control process proceeds to S207. In contrast, if it is determined that the rotation speed N is not greater than the second determination threshold A2 corresponding to YES at S203, the drive control process proceeds to S204.

At S204, it is determined whether the phase angle θi of the current vector i* is within the start-up allowable range P. If it is determined that the phase angle θi is within the start-up allowable range P corresponding to YES at S204, the drive control process proceeds to S208. In contrast, if it is determined that the phase angle θi is outside the start-up allowable range P corresponding to NO at S203, the drive control process proceeds to S205.

Procedures performed at S205 and S206 are the same as the procedures performed at S104 and S105 in FIG. 11, respectively. That is, the drive mode is switched to the FF control mode at S205, and the second d-axis and q-axis voltage command values vd*_2 and vq*_2 are selected as the d-axis and q-axis voltage command values vd* and vq* used to calculate the PWM signals UU, UL, VU, VL, WU, and WL.

At S207, to which the drive control process proceeds If it is determined that the rotation speed N is greater than the second determination threshold A2 corresponding to NO at S203, it is determined whether the rotation speed N is not greater than the first determination threshold A1. If it is determined that the rotation speed N is greater than the first determination threshold A1 corresponding to NO at S207, the drive control process proceeds to S209. In contrast, if it is determined that the rotation speed N is not greater than the first determination threshold A1 corresponding to YES at S207, the drive control process proceeds to S208.

A procedure performed at S208, to which the drive control process proceeds if it is determined that the rotation speed N is not greater than the second determination threshold A2 corresponding to YES at S203 and that the phase angle θi is within the start-up allowable range P corresponding to YES at S204, or if it is determined that the rotation speed N is greater than the second determination threshold A2 corresponding to NO at S203 and that the rotation speed N is not greater than the first determination threshold A1 corresponding to YES at S207, is the same as the procedure performed at S107 in FIG. 11. That is, at S208, the drive mode is switched to the DR control mode, where the signs of the d-axis and q-axis current differences Δid and Δiq are reversed at the reverse interval Tr, and the first d-axis and q-axis voltage command values vd*_1 and vq*_1 are calculated based on the d-axis and q-axis current differences Δid and Δiq whose signs are reversed at the reverse interval Tr.

A procedure performed at S209, to which the drive control process proceeds If it is determined that the rotation speed N is greater than the first determination threshold A1 corresponding to NO at S207, is the same as the procedure performed at S108 in FIG. 11. That is, at S209, the first d-axis and q-axis voltage command values vd*_1 and vq*_1 are calculated based on the d-axis and q-axis current differences Δid and Δiq whose signs are not reversed.

A procedure performed at S210 is the same as the procedure performed at S109 in FIG. 11. That is, at S210, the first d-axis and q-axis voltage command values vd*_1 and vq*_1 are selected as the d-axis and q-axis voltage command values vd* and vq* used to calculate the PWM signals UU, UL, VU, VL, WU, and WL.

As described above, according to the third embodiment, when the phase angle θi of the current command vector i* is within the start-up allowable range P (YES at S204), the AC motor 2 is controlled in the current FB control mode even if the rotation speed N is not greater than the second determination threshold A2 (YES at S203). Thus, when the phase angle θi is within the start-up allowable range P, the AC motor 2 can be controlled in the current FB control mode instead of the FF control mode.

Correspondence between terms used in the third embodiment and claims is as follows. S201 in FIG. 21 corresponds to procedures as functions of a current receiver, a rotation angle receiver, and a rotation speed calculator. S202 corresponds to a procedure as a function of a current estimator. S208 and S209 correspond to procedures as a function of a first voltage command value calculator. S208 corresponds to a procedure as a function of a difference reverser. S205 corresponds to a procedure as a function of a second voltage command value calculator. S206 and S210 correspond to procedures as a function of a control mode switch.

(Modifications)

The embodiments can be modified in various ways, for example, as follows.

(1) Current FB Control

Figure 22:
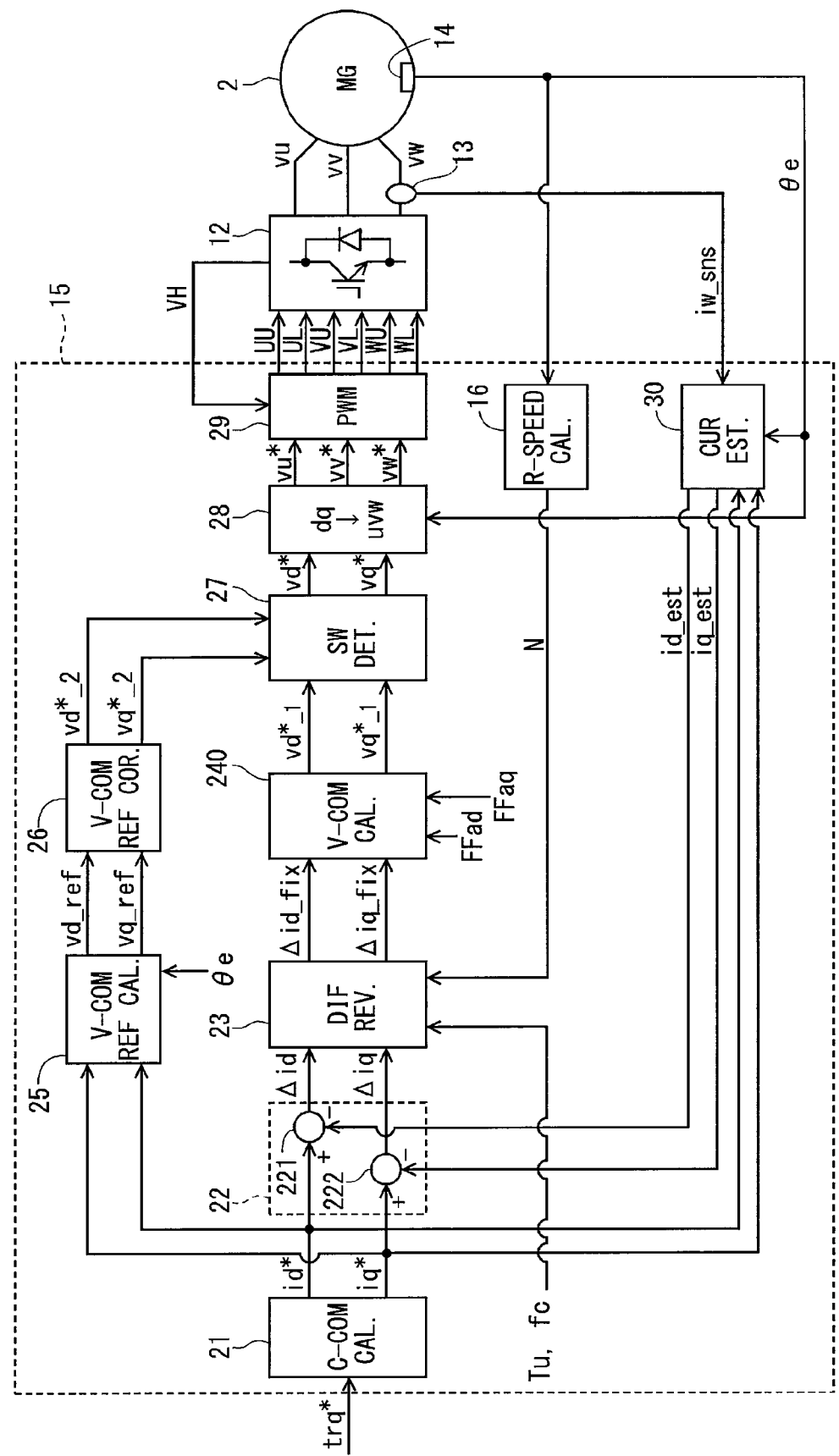
FIG. 22 is a block diagram of a controller according to a modification.

In the embodiments, the PI calculator 24 calculates the first voltage command value by PI calculation. Alternatively, as shown in FIG. 22, a voltage command value calculator 240 can be used instead of the PI calculator 24. The voltage command value calculator 240 calculates the first d-axis and q-axis voltage command values vd*_1 and vq*_1 based on d-axis and q-axis FF-term correction values FFad and FFaq in addition to the d-axis and q-axis current difference fixed values Δid fix and Δiq fix. A calculation performed by the voltage command value calculator 240 is not limited to a specific calculation but includes PI calculation. For example, the d-axis and q-axis voltage command reference values vd_ref and vq_ref, which are calculated based on the d-axis and q-axis current command values id* and iq* using the voltage equations as a theoretical formula for a motor, can be used as the d-axis and q-axis FF-term correction values FFad and FFaq. Alternatively, the d-axis and q-axis deadtime correction values vd_dt and vq_dt can be used as the d-axis and q-axis FF-term correction values FFad and FFaq. Alternatively, the d-axis and q-axis voltage command reference values vd_ref and vq_ref and the d-axis and q-axis deadtime correction values vd_dt and vq_dt can be combined to be used as the d-axis and q-axis FF-term correction values FFad and FFaq. That is, the d-axis and q-axis FF-term correction values FFad and FFaq are not limited to specific values. Although FIG. 22 shows an example where the PI calculator 24 of the controller 15 of the second embodiment is replaced with the voltage command value calculator 240, the controller 15 of the first embodiment can also have the voltage command value calculator 240 instead of the PI calculator 24.

(2) Estimation Current FB Control

In the embodiments, the current estimator calculates the d-axis and q-axis current estimation values by considering the current command values of the phases, other than the sensor-phase, as the estimation values.

The current estimator can calculate the d-axis and q-axis current estimation values by any other method than that described in the embodiments, as long as the d-axis and q-axis current estimation values are calculated based on the current detection value and the electrical angle. Further, the d-axis and q-axis current estimation values can be calculated based on another parameter in addition to the current detection value and the electrical angle. The first voltage command value can be calculated by any other method than that described in the embodiments, as long as the first voltage command value is calculated based on the current command value and the feedback current estimation values. Further, the first voltage command value can be calculated based on another parameter in addition to the current command value and the feedback current estimation values.

In the embodiments, the d-axis and q-axis current estimation values and the first d-axis and q-axis voltage command values are always calculated regardless of the rotation speed. Alternatively, the d-axis and q-axis current estimation values and the first d-axis and q-axis voltage command values can be calculated only when the rotation speed is greater than the second determination threshold. In other words, there can be no need to calculate the d-axis and q-axis current estimation values and the first d-axis and q-axis voltage command values when the rotation speed is not greater than the second determination threshold.

For example, the current estimator can employ any of the following current estimation methods (i), (ii), (iii), and (iv) instead of the method disclosed in the embodiments. Here, a U-phase is defined as a sensor-phase.

(i) Estimation Based on a Current Reference Angle, which is Based on a Current Command Phase Angle, and a Current Amplitude.

For example, as disclosed in JP-A-2004-159391, a current amplitude (Ia) is calculated by dividing a current detection value (Iu) of the sensor-phase by a U-phase current reference angle (θ') which is calculated from an electrical angle and a current command phase angle which is calculated from d-axis and q-axis current command values. Then, the other two phase current estimations values iv, iw are calculated by multiplying the current amplitude by sine values of electrical angles shifted by ±120° with respect to U-phase current reference angle (refer to formulas (11.1), (11.2), and (11.3)).

$$Ia=Iu/[\sqrt{(\frac{1}{3})} \times \{-\sin(\theta')\}] \quad (11.1)$$

$$Iv=\sqrt{(\frac{1}{3})} \times Ia \times \{-\sin(\theta'+120°)\} \quad (11.2)$$

$$Iw=\sqrt{(\frac{1}{3})} \times Ia \times \{-\sin(\theta'+240°)\} \quad (11.3)$$

(ii) Estimation Based on a Sensor-Phase Reference Phase Using a Current Command Value A α-axis current ia in a α-axis direction coinciding with a sensor-phase and a β-axis current in a β-axis direction perpendicular to the sensor-phase are calculated based on a W-phase current detection value iw_sns, an electrical angle θe, and at least one of a U-phase current command value iu* and a V-phase current command value iv*. Then, a sensor-phase reference current phase θx is calculated from the following formula (12).

$$\theta x = \tan^{-1}(i\beta/i\alpha) \quad (12)$$

Then, one of a U-phase current estimation value iu_est and a V-phase current estimation value is calculated based on the sensor-phase reference current phase θx and the W-phase current detection value iw_sns. Then, d-axis and q-axis current estimation values id_est and iq_est are calculated based on the W-phase current detection value iw_sns, the electrical angle θe, and the one of the U-phase current estimation value iu_est and the V-phase current estimation value iv_est.

When the one of the U-phase current estimation value iu_est and the V-phase current estimation value iv_est is calculated, a correction process can be performed to avoid division by zero and/or multiplication by zero.

(iii) Estimation Based on Differential of α-Axis Current

Since a α-axis current ia and a β-axis current iβ have a relationship between a sine wave and a cosine wave, there is a phase difference of 90[°] between the α-axis current ia and the β-axis current iβ. From this point of view, a β-axis current estimation value iβ_est is calculated based on a α-axis current differential value Δia. When the calculation in the controller is discrete, the α-axis current differential value Δia is delayed by a half of an electrical angle change Δθe, i.e., delayed by Δθe/2, with respect to the actual β-axis current iβ. For the above reason, it is preferable that the β-axis current estimation value iβ_est should be corrected by a correction value H which is calculated by multiplying Δθe/2 by an average of previous and present values of the α-axis current ia. Then, a sensor-phase reference current phase θx is calculated based on the α-axis current ia and the β-axis current estimation value iβ_est in the same manner as in the method (ii).

(iv) Estimation Based on a Recurrence Formula

Based on the fact that a W-phase axis relatively rotates on a dq coordinate, a W-phase estimation error Δiw_est is integrated so that d-axis and q-axis current estimation values gradually approach d-axis and q-axis current actual values, respectively.

Specifically, a W-phase current reference value iw_bf which is a component of a sensor-phase is calculated based on previous values of the d-axis and q-axis current estimation value id_est and iq_est, and a present value of the electrical angle θe. Then, the W-phase estimation error Δiw which is a difference between the W-phase current reference value iw_bf and the W-phase current detection value iw_sns is calculated. Then, a corrected error KΔiw is calculated by multiplying the W-phase estimation error Δiw by a gain K which is a filter factor. Then, d-axis and q-axis correction values id_crr and iq_crr are calculated by dq transformation of the corrected error KΔiw under conditions that Δiu=0, and Δiv=0.

Then, the d-axis and q-axis correction values id_crr and iq_crr are defined as a sensor-phase direction correction vector, and d-axis and q-axis current estimation values id_est and iq_est are calculated by integrating the correction vector on a dq coordinate system.

Alternatively, orthogonal direction correction values orthogonal to the sensor-phase can be calculated and defined as an orthogonal direction correction vector, and the d-axis and q-axis current estimation values id_est and iq_est can be calculated by integrating a resultant vector of the sensor-phase direction correction vector and the orthogonal direction correction vector on the dq coordinate system.

(3) The first and second determination thresholds of the rotation speed based on which the control mode switches can be set according to control mode characteristics including a lower limit of the rotation speed in the estimation current FB control mode and a calculation accuracy in the estimation current FB mode.

In the embodiments, one first determination threshold is used to switch the control mode between the DR control mode and the estimation current FB mode, and one second determination threshold is used to switch the control mode between the FF control mode and the estimation current FB mode. Alternatively, in order to prevent hunting from occurring due to the control mode switching, the determination threshold can be different between when the rotation speed increases and when the rotation speed decreases. That is, the determination threshold can have hysteresis. In this case, although it is preferable that a first determination threshold A1u used when the rotation speed increases be greater than a first determination threshold A1d used when the rotation speed decreases, the first determination threshold A1u can be smaller than the first determination threshold A1d. Likewise, although it is preferable that a second determination threshold A2u used when the rotation speed increases be greater than a second determination threshold A2d used when the rotation speed decreases, the second determination threshold A2u can be smaller than the second determination threshold A2d.

(4) In the embodiments, the second voltage command value is calculated by correcting the voltage command reference value which is calculated from the voltage equation as a theoretical formula for a motor. Alternatively, the voltage command reference value can be calculated by any other method such as by referring to a prestored mapping table, as long as the voltage command reference value is calculated based on the current command value. The voltage command reference value and the voltage command value can be calculated based on a value, depending on the current command value, such as the torque command value or the rotation speed.

(5) In the embodiments, the current estimation value, the current command value, the first voltage command value, and the second voltage command value are based on a dq coordinate system. Alternatively, these values can be based on values corresponding to phases of the AC motor or other axes.

(6) The inverter for controlling a voltage applied to the AC motor can be controlled by any method. For example, the inverter can be controlled in multiple modes including a sinusoidal PWM mode and an overmodulation PWM, and a control mode of the inverter can be suitably switched between the modes.

(7) In the embodiments, the current sensor is provided to the W-phase, and the W-phase is defined as the sensor-phase. Alternatively, the current sensor can be provided to the U-phase, and the U-phase can be defined as the sensor-phase. Alternatively, the current sensor can be provided to the V-phase, and the V-phase can be defined as the sensor-phase.

(8) In the embodiments, the current sensor (hereinafter referred to as the "control current sensor") for detecting a current used for control is provided to one phase. Alternatively, in addition to the control current sensor, a monitor current sensor specialized to monitor whether the control current sensor is normal or abnormal can be added to the sensor-phase or another phase. For example, a "one-phase two-channel configuration" in which both the control current sensor and the monitor current sensor are provided to the sensor-phase can be employed, or a "two-phase one-channel configuration" in which the control current sensor is provided to the sensor-phase, and the monitor current sensor is provided to a phase other than the sensor-phase can be employed. In any configuration, any number of current sensors can be provided to any phase of the AC motor.

(9) In the embodiments, the rotation angle sensor detects and outputs the electrical angle θe to the controller. Alternatively, the rotation angle sensor can detect and output a mechanical angle θm to the controller, and a conversion of the mechanical angle θm to the electrical angle θe can be performed in the controller. Further, the mechanical angle θm can be used as a rotation angle detection value instead of the electrical angle θe. Furthermore, the rotation number speed N can be calculated based on the mechanical angle θm.

(10) In the embodiments, the AC motor is a permanent magnet three-phase synchronous motor. Alternatively, the AC motor can be an induction motor or another type of synchronous motor. In the embodiments, the AC motor is a so-called motor generator serving as not only a motor but also a generator. Alternatively, the AC motor can serve as only a motor.

The AC motor can work as a motor to start the engine. The motor-operated vehicle can have no engine. The motor-operated vehicle can have multiple AC motors. In this case, the motor-operated vehicle can have a force division mechanism for dividing drive forces of the AC motors.

(11) In the embodiments, the motor control apparatus according to the present disclosure is applied to a motor drive system having one set of an AC motor and an inverter. Alternatively, the motor control apparatus can be applied to a motor drive system having multiple sets of AC motors and inverters. Further, the motor control apparatus can be applied to a system, for example, used in a train, having multiple AC motors connected in parallel to one inverter.

Further, the motor control apparatus can be used to control an AC motor mounted on an apparatus or a system other than a motor-operated vehicle.

What is claimed is:

1. A control apparatus for controlling a three-phase AC motor to which a voltage controlled by an inverter is applied, the control apparatus comprising:
a current receiver configured to receive a current detection value from a current sensor provided to one of three phases of the AC motor;
a rotation angle receiver configured to receive a rotation angle detection value from a rotation angle sensor that detects a rotation angle of the AC motor;
a rotation speed calculator configured to calculate a rotation speed of the AC motor based on the rotation angle detection value;
a current estimator configured to calculate a current estimation value based on the current detection value and the rotation angle detection value;
a difference calculator configured to calculate a difference between a current command value related to driving of the AC motor and the feedback current estimation value;
a first voltage command value calculator configured to calculate a first voltage command value based on the difference, the first voltage command value used to generate a drive signal related to driving of the inverter, and
a difference reverser configured to reverse a sign of the difference at a reverse interval when the rotation speed is not greater than a first determination threshold.

2. The control apparatus according to claim 1, further comprising:
a second voltage command value calculator configured to calculate a second voltage command value based on the current command value, the second voltage command value used to generate the drive signal; and
a control mode switch configured to switch a control mode between a first mode and a second mode based on the rotation speed, wherein
when the rotation speed is greater than a second determination threshold smaller than the first threshold, the control mode switch switches the control mode to the first mode,
when the rotation speed is not greater than the second determination threshold, the control mode switch switches the control mode to the second mode,
in the first mode, the drive signal is generated based on the first voltage command value, and
in the second mode, the drive signal is generated based on the second voltage command value.

3. The control apparatus according to claim 2, wherein
even when the rotation speed is not greater than the second determination threshold, the control mode switch switches the control mode to the first mode under a condition that a phase angle of a current command vector is within a start-up allowable range.

4. The control apparatus according to claim 2, wherein the second voltage command value calculator calculates the second voltage command value by correcting a voltage command reference value which is calculated from a theoretical formula for the motor based on the current command value.

5. The control apparatus according to claim 3, wherein the second voltage command value calculator calculates the second voltage command value by correcting a voltage command reference value which is calculated from a theoretical formula for the motor based on the current command value.

6. The control apparatus according to claim 1, wherein the reverse interval varies depending on at least one of a carrier frequency, a control period, and the rotation speed.

7. The control apparatus according to claim 2, wherein the reverse interval varies depending on at least one of a carrier frequency, a control period, and the rotation speed.

8. The control apparatus according to claim 3, wherein the reverse interval varies depending on at least one of a carrier frequency, a control period, and the rotation speed.

9. The control apparatus according to claim 4, wherein the reverse interval varies depending on at least one of a carrier frequency, a control period, and the rotation speed.

10. The control apparatus according to claim 5, wherein the reverse interval varies depending on at least one of a carrier frequency, a control period, and the rotation speed.

* * * * *